United States Patent [19]
Leuthold et al.

[11] Patent Number: 5,933,554
[45] Date of Patent: Aug. 3, 1999

[54] COMPACT OPTICAL-OPTICAL SWITCHES AND WAVELENGTH CONVERTERS BY MEANS OF MULTIMODE INTERFERENCE MODE CONVERTERS

[76] Inventors: Juerg Leuthold, Engadiner-Weg 18, 8049 Zürich, Switzerland; Pierre-Andre Besse, Avenue la Piscine 30, 1020 Renens VD, Switzerland; Maurus Bachmann, Lindenhofstrasse 31, 8617 Mönchaltdorf, Switzerland

[21] Appl. No.: 08/875,714
[22] PCT Filed: Jan. 29, 1996
[86] PCT No.: PCT/CH96/00035
    § 371 Date: Aug. 27, 1997
    § 102(e) Date: Aug. 27, 1997
[87] PCT Pub. No.: WO96/24080
    PCT Pub. Date: Aug. 8, 1996

[30] Foreign Application Priority Data

| Feb. 1, 1995 | [CH] | Switzerland | 266/95 |
| Feb. 1, 1995 | [CH] | Switzerland | 319/95 |
| Feb. 22, 1995 | [CH] | Switzerland | 508/95 |
| Jul. 25, 1995 | [CH] | Switzerland | 2177/95 |

[51] Int. Cl.$^6$ ........................... G02B 6/26
[52] U.S. Cl. ............... 385/28; 385/9; 385/14; 385/15; 385/16
[58] Field of Search ............... 385/28, 9, 14, 385/15, 16–24, 29, 30, 31, 50

[56] References Cited

PUBLICATIONS

Bachmann et al. "Overlapping–Image Multimode Interference Couplers With a Reduced Number of SEL–Image for Uniform And Nonuniform Power Splitting" Applied Optics/vol. 34, No. 30/20 Oct. 20, 1995.

*Primary Examiner*—Phan Palmer
*Attorney, Agent, or Firm*—Walter C. Farley

[57] ABSTRACT

New, compact optical—optical switches and/or wavelength converters manufacturable with good tolerances and evincing all or some of the following properties,
  compactness
  good ON/OFF switching ratios
  possibility of cascading and bidirectional operation
  polarization-independence feasibility
  very fast switching
are being developed.

This requires developing components making use of different-order modes to mix the information signal and the control signal and to separate them. The compact Converter Combiner MMIs of the invention make possible:
  1. converting a first fundamental mode into first-order modes,
  2. superposing the first-order modes and the images of a second fundamental mode,
  3. the MMI operates simultaneously as mode splitter for the participating modes.

Back-conversion of the generated modes of higher order into their initial modes also is possible.

The control signal generating not only a change in phase but also a change in intensity at the input signal, steps must be taken to achieve good ON/OFF switching ratios at the outputs. The problem of achieving good ON/OFF switching ratios is solved by using appropriate mode couplers having variably splitting ratios.

An alternative method for optical—optical switches and wavelength converters is discussed making no use of the optical mode converters of the invention but nevertheless evincing some or all the above properties.

37 Claims, 9 Drawing Sheets

COMPACT OPTICAL-OPTICAL SWITCHES AND WAVELENGTH CONVERTERS BY MEANS OF MULTIMODE INTERFERENCE MODE CONVERTERS

TECHNICAL FIELD

The invention concerns the field of integrated optics and telecommunications. The invention relates to optical—optical switches and wavelength converters having good ON/OFF switching. Optical-optical switches operate with at least two optical signals. To couple these signals into a waveguide, new multimode interference (MMI) couplers are used which can convert at least one signal into a mode of higher order and which can superpose another signal as a fundamental mode with the first signals. These MMIs are very compact.

STATE OF THE ART

Optical signals are transmitted through optical fiber cables for optical telecommunications. Optical signal processing frequently is carried out on integrated optical chips. Illustratively, these chips are composed of polymers, semiconducting thin films, vitreous materials. . . The light is guided on these chips in waveguides [1]. Only light simultaneously meeting the waveguide boundary conditions and Maxwell's equations is guided. The various allowed discrete states of the light in the waveguide are denoted "optical modes". Depending on the geometry of the intensity distribution and phase distribution within a mode, this mode will be assigned another order. Thus, one speaks of modes as being fundamental, of first order, etc.

One class of waveguide structures is known as Multi-Mode-Interferometers (MMIs). These MMIs are versatile in signal processing. Illustratively, MMIs are used as optical light splitters and combiners [2], as light splitters with variable splitting ratios, so-called butterfly MMIs [3] and as "Multileg" MMIs [4].

Recent applications of integrated optics employ modes of higher orders. Mode converters convert fundamental modes into higher-order modes with a further fundamental mode. Mode converters are used as adiabatically anti-symmetric Y combiners [6] in 2×2 digital-optical switches [7] and in Mach-Zehnder interferometers (MZI) [6].

Modes of higher orders also are attractive for optical fast switches and wavelength converters, in particular for so-called optical—optical components. More particularly it has already been shown that cross-phase modulated (XPM) optical—optical switches and wavelength converters allow switching rates well beyond 1 Gbit [8]. Two optical signals are required for this purpose and therefore the procedure is called "optical—optical": on one hand is the input signal to be switched in the switch and on the other hand is an optical control signal providing timing. These signals are fed to a Mach-Zehnder interferometer (MZI) or to a Michelson interferometer (MI) containing non-linear materials (for instance, semiconductor amplifiers etc.) for phase modulation. Depending on whether the control signal is present or absent, the input-signal phase will be modulated in the MZI. Because the phase is shifted only along one arm of the interferometer, the configuration inherently must be asymmetric [9].

Various designs for achieving this asymmetry have already been suggested, and the following systems have been demonstrated or proposed:

- wavelength converters with asymmetric splitting of the input signal into the MZI [10]; so-called "directional couplers" are used as signal splitters,
- optical—optical switches with a signal output for ON/OFF [11]; the input signal is symmetrically guided toward the MZI with the non-linear sub-system, but on the other hand the control signal is asymmetrically guided along one arm of the MZI; the control signal was converted by adiabatic asymmetric Y-arms into a first-order mode (higher order mode).

These systems are based on very promising components. Unfortunately the components generating the higher order mode as well as the optical—optical components incur several drawbacks:

- Even though conversion into a higher order mode and the simultaneous superposition of a further optical signal using adiabatic anti-symmetric Y combiners takes place fairly satisfactorily, there are shortcomings on account of the substantial length and the critical manufacturing tolerances.
- It would be desirable moreover for the switches to offer good ON/OFF switching ratios; but the above structures are deficient precisely in this respect because they do not take into account the change in intensity entailed by the phase shift. Unless taken into account, this change in intensity in turn leads to poor switching, that is, to poor ON/OFF switching on at least one of the two outputs.
- At the input or at the output, the above switches do not guide the control and data signals in different waveguides. Therefore, the components may be cascaded only unsatisfactorily on a single chip. Even bidirectional operation is difficult because the control signal interferes with one output of the switch.
- There are applications requiring compact optical—optical switches, for which reason new, shorter configurations are desirable.

Another problem concerns the carrier recombination time. This time limits the switching rate of the optical—optical switches. A large control signal may so markedly reduce the carriers in a non-linear region of an MZI arm that, at the next signal, the non-linear region still shows a reduced carrier concentration and switches back only poorly into the fundamental state. This problem can be circumvented by introducing a time-shifted, second control signal into the other arm to symmetrically discharge the non-linear regions. Moreover, instead of time-shifting the control signal, the two non-linear regions also may be mutually spatially offset to achieve the same effect [12]. However, if it is possible to guide the two signals of an MZI configuration in mutually time-shifted manner in the same nonlinear region and to use the control signal to switch the second signal beforehand or during its time in the non-linear region, the problem of non-linear regions discharged in different manners will have been circumvented. Reference [13] proposes a polarization-depending solution. However, novel switches ought to be polarization-independent.

SUMMARY OF THE INVENTION

An object of the invention is,

To provide novel, compact optical—optical switches and/or wavelength converters that can be manufactured with good tolerances and having all or some of the following properties:

compactness,
good ON/OFF switching,
feasibility of cascading and bidirectional operation,
polarization-independence,
high-speed switching.

First, devices must be developed that employ different-order modes so as to mix or mutually separate the information signal and the control signal. That means that devices which allow on one hand optical mode conversion from a fundamental mode into one or more higher-order modes and on the other hand the superposition of the converted modes with other optical signals using compact devices.

Next, methods must be created for achieving good ON/OFF switching so that good switches become possible.

Furthermore, an alternative method is developed for optical—optical switches and wavelength converters that do not resort to optical mode converters of the invention but nevertheless have some or all of the above properties.

Thus, the object of the invention to couple first-order modes into optical—optical switches is achieved by means of novel, compact multimode interference couplers. These MMIs allow mode conversion, back conversion and superposition with other modes or imaging of modes of different order into common waveguides at different intensities. In order to be able to operate the optical—optical switches as switches with two good ON/OFF switching ratios, two asymmetries are designed into the MZI configuration. The two asymmetries are selected in such manner that both the phase and the intensity can be controlled in the MZI configuration. The method is widely applicable. The proposed switches can be operated in cascade or in bidirectional manner depending on application because the operations take place with modes of different orders that are easily separated. The use of an "inner" MZI configuration allows designing cascaded, bi-directionally driven structures that do not use the above MMIs.

The problem of the carrier-related speed limitations can be fully solved, for instance, by using a second, time-shifted control signal, however also by splitting one mode into modes of different orders sequentially moving through the same non-linear regions. As a result high-speed switching is possible.

IMPLEMENTATION OF THE INVENTION

First, a few definitions for the terminology used in this application:

Coupler: a general term for mode splitter or mode combiner.

Mode splitter: a system for splitting one or more optical modes into several optical modes, and also serving generally as a mode combiner if called for.

Mode Combiner: mixes various input modes depending on intensity and phase relations to each other into various output waveguides. Also may be generally used as a mode splitter.

Mode Separator: a system which images modes of various orders into particular waveguide per mode.

Mode filters: a system imaging the modes of different orders into different waveguides.

Control signal: an optical signal strong enough to produce a change in refractive index in a non-linear material and able to noticeably change the phase of another signal. Depending on application, the control signal also may be considered a data signal.

XPM: an abbreviation for "cross-phase-modulation", a more rigorous specification for a Mach-Zehnder Interferometer (MZI) or a Michelson Interferometer (MI) having at least one region with a non-linear medium.

Switch with two good outputs: a switch able to image one input signal from an input waveguide with good ON/OFF switching ratios onto two outputs. Without explicit referral herein to what follows, such switches also are suitable for imaging signals from two inputs with good ON/OFF switching ratios onto one output. Illustratively, the switch might be operated backwards or a switch with two input waveguides may be used.

The following begins with the description of the MMIs because they are used in the optical—optical switches and in relation to the drawings.

Figure 1:
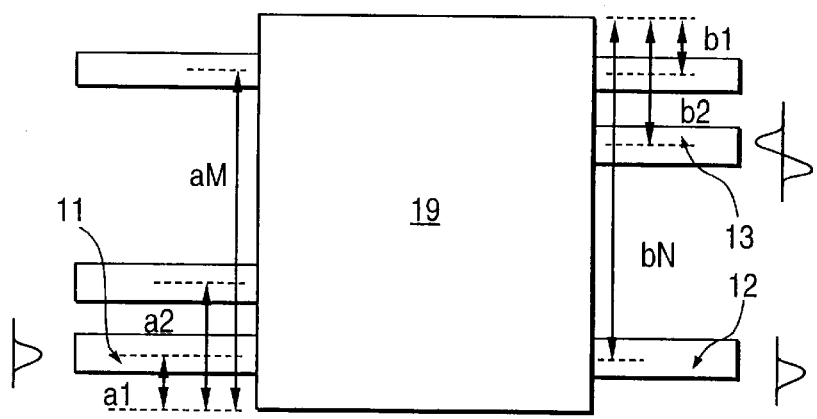
FIG. 1 shows an example of an MMI used to generate a higher-order mode.

Multimode interferometers comprise the following systems (FIG. 1):

at least one wavelength input 11 able to guide the input mode, an interference portion 19 (the MMI proper), and waveguide outputs 12, 13 able to guide the generated modes.

The converted mode (mode of higher order) has two features essential to the generation of same:

the converted mode shows a characteristic intensity profile, the converted mode has a characteristic phase function.

By selecting appropriate positions of the waveguide inputs and their outputs and also appropriately selecting the MMI geometry, for instance being rectangular, polygonal . . . , MMI mode conversion can be implemented using the MMIs.

Figure 2:
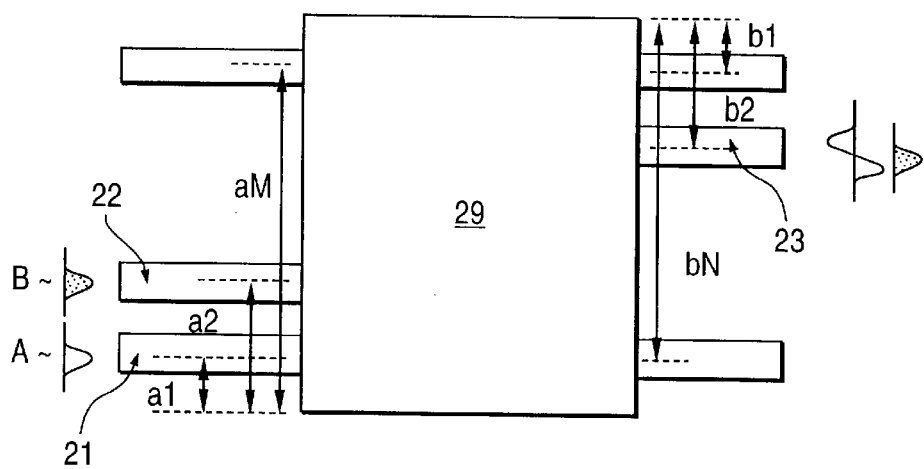
FIG. 2 shows an example of a general MMI structure for coupling two modes into the same waveguide and simultaneously converting at least one mode into a higher-order mode.

The problem of coupling two or more modes from different inputs into the same output waveguide with simultaneous mode conversion of at least one mode using MMIs can be solved by using at least two waveguide inputs. Illustratively, it is then possible to image a fundamental mode from input 21 in FIG. 2 into a first-order mode onto the output 23 and to image another fundamental mode from input 22 as a fundamental mode onto the same output 23.

On the basis of the above general designs, the following particular MMI structures result:

MMIs able to image symmetric modes of order m (for instance m=0 for the fundamental mode) onto one or more modes of order 2m+1 (for instance fundamental modes of first order) and on modes of order m. The waveguide input for the optical mode to be converted is located at the boundary of the MMI input.

Figure 3:
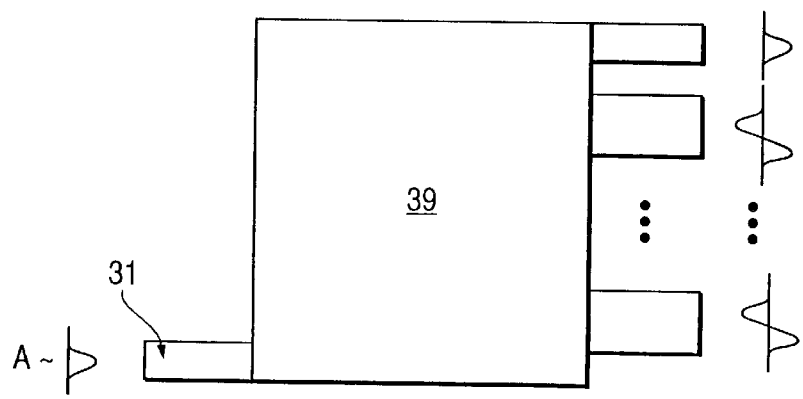
FIG. 3 shows an MMI of the invention allowing imaging of fundamental modes onto one or more modes of first order and onto fundamental modes.

FIG. 3 is an example of such an MMI Converter. The mode to be converted (for instance a fundamental mode A in this case) is coupled into the MMI at the waveguide input. The rectangular MMI, of which the length coincides with those N×N MMIs (integers n≧3) known from the literature (M. Bachmann, P. A. Besse & H. Melchior, "General self-imaging properties of N×N multimode interference couplers including phase relations", Applied Optics, vol. 33, pp 3905–3911, July 1994), images the mode for n=odd number on (n−1)/2, resp. for even numbers n onto (n−2)/2 modes of first order and on one resp. two fundamental modes. In FIG. 3, n was illustratively selected being odd.

DESCRIPTION OF THE GENERAL (3K)×(3K) MMI CONVERTER COMBINER

Figure 4A:
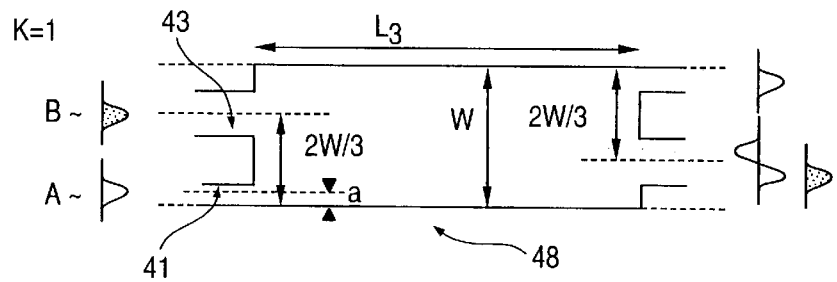
FIG. 4 shows the design principle of the "General (3k)×(3k) MMI Converter Combiner", with
  (a) special case k=1 and (b) special case k=2.
Figure 4B:
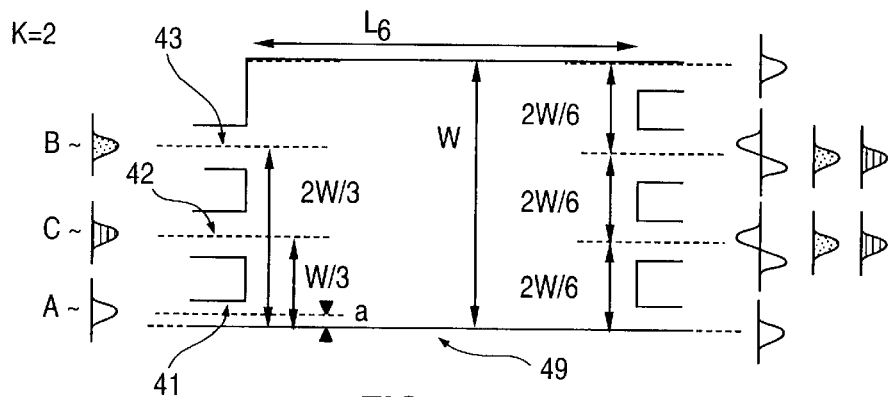

FIGS. 4*a* and 4*b* show the cases of k=1 and k=2. This MMI makes it possible to image an optical fundamental mode A onto (3k−2)/2 resp. (3k−1)/2 first-order modes. Accordingly a very compact mode converter may be used. For k=1, the conversion efficiency is almost 66%. At the same time this MMI is enabled to image another fundamental mode B onto k fundamental modes and to superpose them with the first-order modes. Thereby three features are achieved by this design in a single compact system:

1. Conversion of a fundamental mode A into first-order modes.

2. Superposition of the first-order modes on the images of a second fundamental mode B.

3. The MMI simultaneously acts as a mode splitter, both for the fundamental mode A into the first-order modes and for the fundamental mode B into latter's fundamental modes.

The "General (3k)×(3k) MMI Converter Combiner" allows splitting and superposition on exactly k MMI outputs. The conversion efficiency of the fundamental mode A into first-order modes onto the k outputs where overlap is possible is theoretically almost 66%. Theoretically, the conversion efficiency of the fundamental mode B onto the k outputs is 100%.

In case k is selected as even, this system offers further properties. Thus, it allows coupling a further fundamental mode C onto the k outputs into which the images of the modes A and B also are reproduced. A fourth mode D, which also may be imaged onto a first-order mode, also may be imaged through a separate input onto these overlapping k outputs. The latter's conversion efficiency onto these overlapping k outputs also is almost 66%.

The MMI geometry is determined by the positions of the waveguide inputs at the MMI and by the MMI geometry itself. Given a freely selectable MMI width w and a rectangular MMI, the length will correspond to that of the (3k)×(3k) MMI of M. Bachmann, P. A. Besse & H. Melchior, "General self-imaging properties in N×N multimode interference couplers including phase relations", Applied Optics, vol. 33, pp 3905–3911, July 1994:

$$L_{3k}=(3L_c)/(3k), L_c=(4nW^2)/(3\lambda),$$ Eq. 1 where k is an integer which is a constant, n is the effective real index of refraction, W the MMI width, width denoting the geometric width inclusive of the depth of penetration of the modes in the MMI into the adjacent material, and $\lambda$ is the wavelength in vacuum. The length given by Eq. 1 will vary in the event of deviation from the rectangular MMI shape. The waveguide inputs (41) of mode A guiding the fundamental mode A which is being converted are located at the lower and/or upper edges of the MMI. The freely selectable parameter "a" determines the shape of the intensity distribution of the first-order mode. The positions of the waveguide inputs for modes B and C are distances 2w/3 and w/3 resp. from the longitudinal edges of the MMI.

Figure 5A:
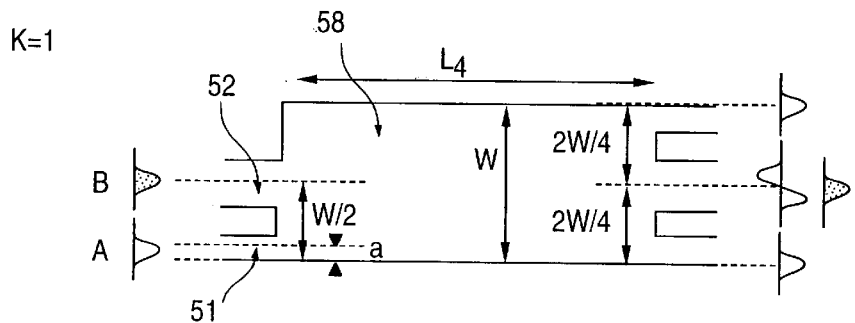
FIG. 5 shows the design principle of the "General (4k)×(4k) MMI Converter-Combiner", with
  (a) special case k=1 and (b) special case k=2.
Figure 5B:
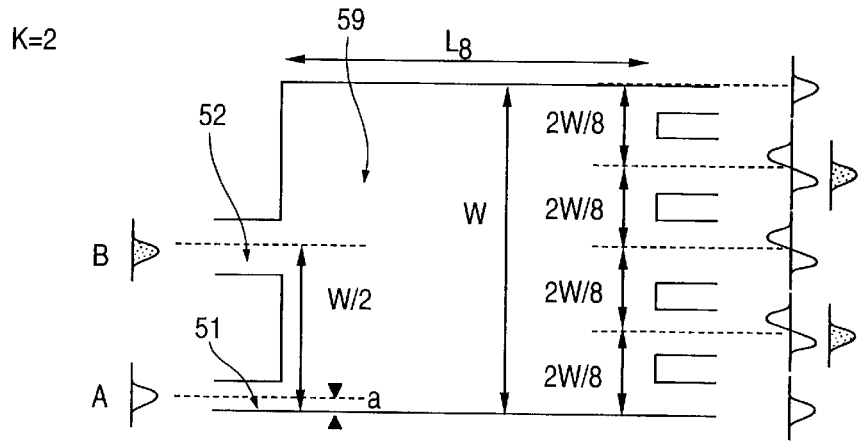

A description of the "General (4k)×(4k) MMI Converter Combiner" is also given below. FIGS. 5a and 5b show the cases of k=1 and k=2.

This MMI makes it possible to image an optical fundamental mode A onto 2k–1 modes of first order. Accordingly it may be used as another variation of a very compact mode converter. For k=1, the conversion efficiency is nearly 50%. This MMI furthermore allows imaging another fundamental mode B onto k fundamental modes and to superpose the latter on first-order modes. As a result this configuration achieves three features in a single compact system:

1. Conversion of a fundamental mode A into first-order modes,
2. Superposition of the first-order modes on the images of a second fundamental mode B,
3. Simultaneous function of the MMI as a mode splitter both for the fundamental mode A onto the first-order modes and for the fundamental mode B onto its fundamental modes.

The "General (4k)×(4k) MMI Converter Combiner" allows splitting and overlapping exactly k MMI outputs. The conversion efficiency of the fundamental mode A into first-order modes onto the k outputs where overlap is possible theoretically is nearly 50%. The conversion efficiency of the fundamental mode B onto the k outputs theoretically is 100%.

The MMI evinces another advantageous property. A third mode D, which also can be imaged onto a first-order mode, furthermore can also be imaged through a separate input onto these overlapping k outputs. The conversion efficiency of this mode D onto these overlapping k outputs also is 50%. The MMI geometry is determined by the positions of the waveguide inputs at the MMI and by the MMI geometry itself. For a freely selectable MMI width w, then for instance for a rectangular MMI there will be a length corresponding to that of the (4k)×(4k) MMI of M. Bachmann, P. A. Besse & H. Melchior, "General self-imaging properties in N×N multimode interference couplers including phase relations", Applied Optics vol. 33, pp 3905–3911, July 1994, $$L_{4k}=3L_c)/(4k)$$ Eq. 2 where the terms have the same meanings as in Eq. 1.

The wavelength inputs of the modes A and D are in the immediate vicinity of the longitudinal edges of the MMI. The position of the freely selectable parameter "a" again determines the intensity distribution of the first-order mode. The position of the waveguide input for the mode B is a distance W/2 from the MMI longitudinal edge.

Various Converter Combiner MMIs are shown below which image a first fundamental mode A onto exactly k first-order modes and superpose the latter exactly on k fundamental modes from a second fundamental mode B. The mode input intensity is equally distributed over the k MMI outputs. The advantage of these Converter Combiner MMIs is that both the first mode A and the second mode B are superposed almost 100% at the k MMI outputs.

Figure 6:
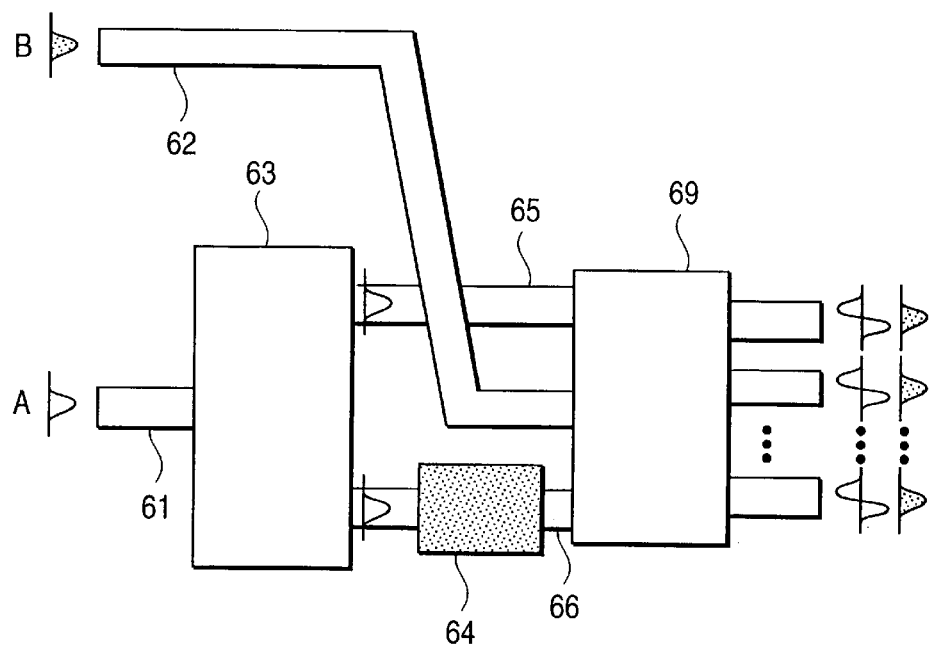
FIG. 6 shows the design principle of variation #1 of the MMI Converter Combiner.

FIG. 6 schematically shows such a (1+)xk MMI Converter Combiner variation #1. This system makes it possible to image an optical fundamental mode A as a first-order mode onto k waveguide outputs. The conversion efficiency for converting to first-order modes is nearly 100%. If only this one input is used, then the system operates as a most efficient mode converter and splitter. In addition, this system allows splitting another optical fundamental mode B into k fundamental modes in the waveguide at the MMI output and to overlap with the above cited k first-order modes.

Again, three features are achieved in this embodiment:

1. Conversion of a fundamental mode A into k first-order modes,
2. Superposition of the first-order modes and the images of a second fundamental mode,
3. Simultaneously the MMI acts as a mode splitter both for the fundamental mode A into k first-order modes and for the fundamental mode B into its k fundamental modes.

The conversion efficiency is nearly 100% both for the input mode A into the converted k first-order modes and for the input mode B into the k fundamental modes.

At the input of the mode to be converted, the system is composed of the following components: a 50/50 mode splitter with two wavelength outputs 63. Said mode splitter for instance may be a 1×2 MMI, a symmetric Y splitter . . . A phase-shifter 64 is located on one of the two. The phase-shifter's design is immaterial. Therefore, it may be an active or a passive phase shifter. Illustratively, a passive phase shifter may be constituted of two concentric waveguide circles of different radii. The mode phase shift on one of the waveguides (66) relative to the mode of the other waveguide (65) is 180° for odd k and 0° for even k. Then the two waveguides are guided toward a General (4k)×(4k) MMI Converter Combiner 69. The input 62 of mode B is located at the middle of the MMI input side of the General (4k)×(4k) MMI Converter Combiner 69. If the input 62 is guided by means of mirrors to the MMI 69, the mode splitter 63 and the General (4k)×(4k) MMI Converter Combiner 69 also may be assembled into a single system.

This system furthermore has the property that for the case k=1 it is able with respect to the reverse direction to fully separate fundamental modes and first-order modes that are present in the same waveguide.

Figure 7:
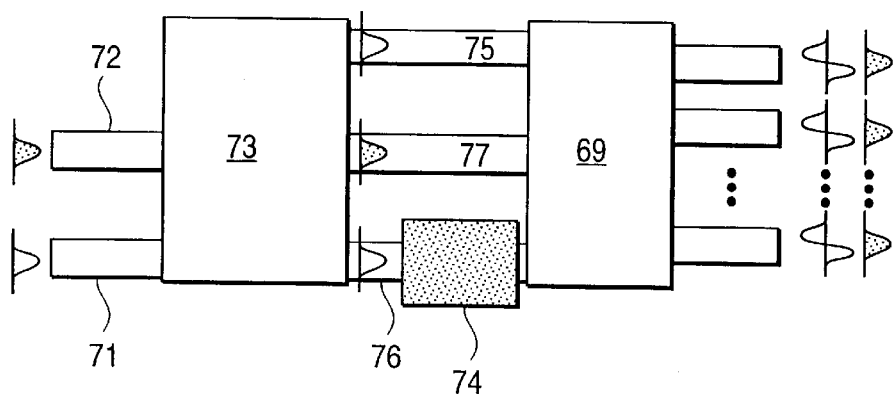
FIG. 7 shows the variation #2 of the design principle of the MMI Converter Combiner.

A second design of such a "(1+1)xk MMI Converter Combiner" variation #2 with k waveguide outputs is shown in FIG. 7. This system offers the same features and performance as the above described variation #1. It differs merely in configuration: The fundamental mode A at the input 71 is imaged in two modes onto a 2×2 MMI (M. Bachmann, P. A. Besse & H. Melchior, "General self-imaging properties in N×N multimode interference couplers including phase relations", Applied Optics, vol. 33, pp 3905–3911, July 1994) with a length $$L = (3L_c)/2 \qquad \text{Eq. 3}$$

into two modes. Beyond the MMI, the two modes are guided by waveguides 75 and 76. A phase shifter 74 follows and precludes a total phase shift of 180° and of 0° between the two modes in the waveguides for odd k and even k resp. As shown in FIG. 7, the two waveguides are fed into a General (4k)×(4k) MMI Converter Combiner 69 and therein are split into k first-order modes. The fundamental mode B is coupled into the center of the 2×2 MMI 77 and is decoupled at the center of the 2×2 MMI output. The fundamental mode B passes through a waveguide 77 into the center of the input side of the General (4k)×(4k) MMI Converter Combiner 69 and from there it is imaged in k fundamental modes. Again the k images of the fundamental mode A and of the fundamental mode B will coincide.

Figure 8:
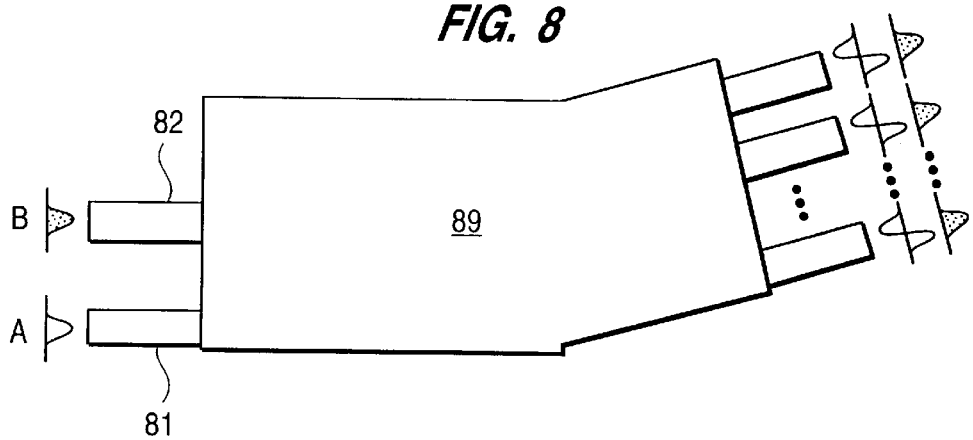
FIG. 8 shows the variation #3 of the design principle of the MMI Converter Combiner.

There is a significant third variation of the MMI Converter Combiner of FIG. 7 which is shown in FIG. 8. This system also offers the same features and performance as the above variation #1. It differs only in configuration: The phase shift of the center part of FIG. 7 now is implemented by rotating the General (4k)×(4k) MMI Converter Combiner 69 relative to the above 2×2 MMI of FIG. 7. The two MMIs, that is the 2×2 MMI 73 and the General (4k)×(4k) MMI Converter Combiner 69 now have been assembled into a single MMI 89.

The above MMI designs can be used as mode filters. If only the center waveguide input 52 of FIG. 5 is used in the General (4k)×(4k) MMI Converter Combiner of FIG. 5, then symmetric modes, for instance the fundamental mode, that were guided in these waveguides are split into k corresponding symmetric modes at the MMI output. The anti-symmetric modes (for instance the first-order modes) also are split, but onto other MMI outputs. Accordingly, resolution into symmetric and anti-symmetric modes is possible.

In the case of k=1, the MMI designs of FIGS. 6, 7 and 8 may be used as mode splitters. If the system is used in the reverse direction, namely their output becoming the inputs of the MMIs, then symmetric modes and anti-symmetric modes in this waveguide will be split into different waveguide outputs. For instance the symmetric fundamental mode is separated from the anti-symmetric first-order mode and the first-order mode is transformed into a fundamental mode.

Further MMI designs are available allowing imaging a symmetric mode (for instance a fundamental mode) and an anti-symmetric mode (for instance a first-order mode) of various intensities onto k output waveguides. In the case of rectangular MMIs, the lengths of these MMIs can be derived from the (2k)×(2k) MMIs known from the literature, namely $$L_{2k} = (3L_c)/(2k) \qquad \text{Eq. 4,}$$

where k is a natural number equal to or larger than 2 and where $L_c$ is the same as defined above. As regards wavelength input positions $x_i^{in} = iw/2k$, where i=1, 2 ... 2k−1 and output positions $X_j^{out} = w - jw/2k$, where j=1,2 ... 2k−1 and where i+j are even numbers, x being measured from a longitudinal edge along the MMI input, the following intensity distribution is found at the output j:

$$r_{ij}^2 = 2/k \sin^2(\pi/2i - ji\pi 4k) \qquad \text{Eq. 5,}$$

for symmetric modes $$r_{ij}^2 = 2/k \cos^2(\pi/2i - ji\pi 4k) \qquad \text{Eq. 6,}$$

for anti-symmetric modes.

If the same position i is selected both for the normalized symmetric and the normalized anti-symmetric modes, then the same constant intensity distribution will be present at all outputs j for the sum of the intensities of the two modes.

Again the same constant intensity distribution will be present at all outputs j when selecting the input position i=2p for the normalized symmetric mode and the input position i'=2k−2p for the normalized anti-symmetric mode.

Figure 9:
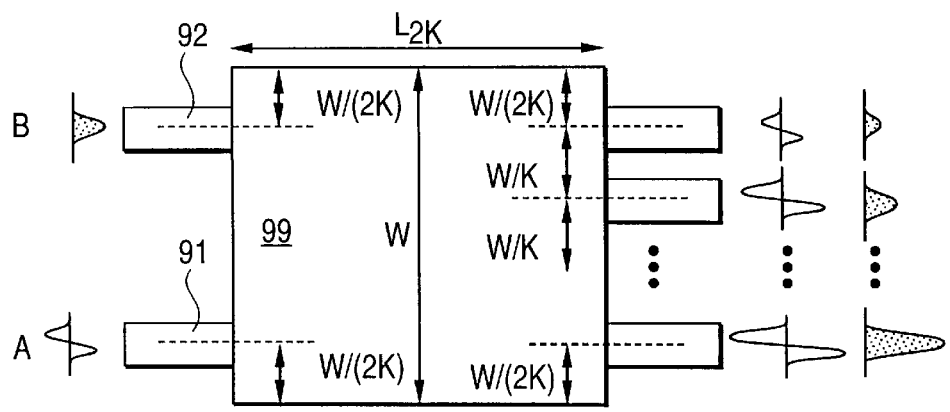
FIG. 9 shows the design principle of an MMI allowing imaging two modes of different symmetries (in this case the fundamental mode and the first order mode) with different splitting ratios onto k outputs. In this illustration the waveguide input positions at the MMI are selected in such manner that both the fundamental mode and also the first order mode have the same splitting ratio at the same output. If for instance k=2 were selected, the splitting ratios at the outputs would be 15:85 both for the first order mode and the fundamental mode.

On the other hand if the input position i=2p+1 is selected for the symmetric mode and the input position i'=2k−2p−1 for the anti-symmetric mode, the same intensity functions will be present at the output j for both modes. FIG. 9 illustratively shows the inputs and outputs for this case.

If arbitrary positions i and i' are selected for the inputs of the symmetric and anti-symmetric modes, quite different splitting ratios will be present at the outputs for the two modes.

Varying the geometry of the MMI may lead to other splitting ratios.

The Converter Combiner MMIs are applicable to the most diverse fields of integrated optics. The particular application discussed below is only one of many applications.

The optical—optical switches and wavelength converters will be described as well as implementing ways. The switches are further developed in such manner that they will image one input onto two outputs with good ON/OFF switching ratios.

Figure 10:
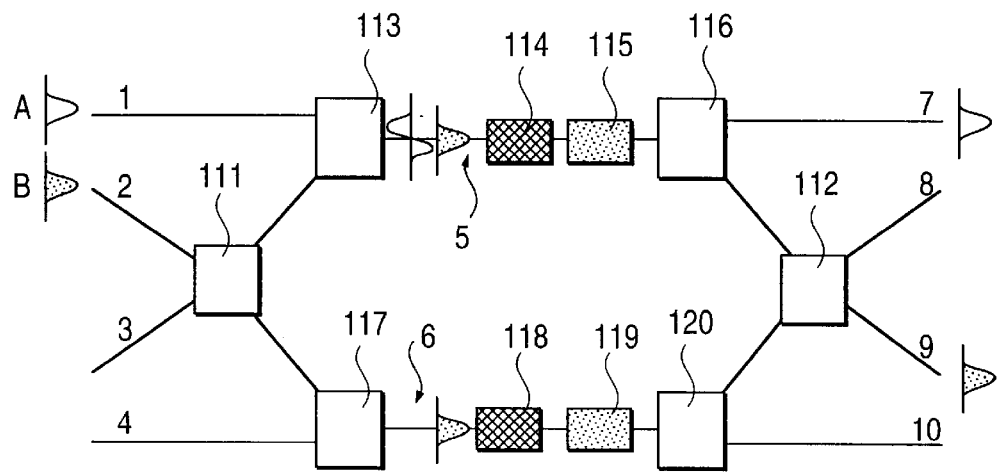
FIG. 10 shows an example of an optical—optical switch with two possible outputs resp. wavelength converters and converting the control signal in an MMI Converter Combiner into a first-order mode and simultaneously guiding it to an MZI waveguide arm.

FIG. 10 is a diagram of an illustrative optical—optical switch with two possible outputs and operating on the principle of cross-phase modulation (XPM) and allowing coupling and converting the control signal by means of MMIs. Such a switch comprises at least:

a mode splitter 111 if the system is operated forward, or 112 if operated backward, splitting an optical input signal B into the two different arms of the MZI configuration. The number of inputs of the mode splitter may be arbitrary, the essential factor being that the input signal is imaged at a given ratio on the waveguide arms.

a mode combiner 112, or 111, combining the input signal and guiding it, depending on phase relation and portions, on the two MZI arms to an output. A switch with two possible outputs requires at least two outputs at the mode combiner 112. One wavelength output suffices for a switch with one output or with one wavelength converter.

a component 113 and/or 117 allowing coupling one or more optical control signals.

at least one or two regions of non-linear material 114 and/or 118. Depending on presence or absence of the optical control signal, a phase shift is generated in this region. Intensity and phase are not independent in an optically non-linear material, but instead they are related by the Kramers-Kronig transformation. The phase shift and the change in intensity produced in this material determine the switching properties of the switch at the output.

an active or a passive phase shifter 115 and/or 119 may be mounted anywhere on the MZI arms. A passive phase shifter for instance might be in the form of two MZI arms of different lengths. Semiconducting amplifiers also may be used as phase shifters. The latter however must be positioned appropriately. For instance, the semiconducting amplifier 115 should be mounted between the components 116 and 112 or between components 111 and 113.

In the above outlined switch, coupling of the control signal takes place directly into one of the MZI arms 5 or 6. The optical control signal is coupled by means of an MMI Converter Combiner 113 and/or 117. In the process the fundamental mode of the optical control signal A is converted into a first-order mode and simultaneously it is combined with the optical input signal B. This MMI Converter Combiner is such as described in relation to FIGS. 2, 4, 5, 6, 7, 8 or 9. Therefore and illustratively it may be a 3×3 MMI Converter Combiner, a 1+1×1 MMI Converter Combiner etc. Depending on application, the optical control signal is then decoupled in the components 116 and/or 120. Illustratively the control signal might be decoupled in a 1+1×1 MMI Converter Combiner that is operated in reverse and be split from the input signal or be decoupled in an MMI filter. However it is also possible not to use the components 116 and/or 120 and to guide the control signal to the mode combiner 112. Another possibility is to use the components 116 and/or 120 to couple another optical signal (for instance a further control signal, pump signal . . . ).

The system of FIG. 10 may be operated as a switch with two outputs. Applicable inputs for the optical control signal are the inputs 1 and 4, or for reverse operation, the inputs 7 and 10. Depending on the selected mode splitters 111 and combiners 112, the optical input signal can be driven by means of the input on the left or on the right side.

The system can be used as a wavelength converter wherein the optical control signal A of wavelength $\lambda_1$ corresponds to an optical signal B of wavelength $\lambda_2$ at one of the outputs. Because it is possible to decouple the control signal at a separate output or to strongly suppress the signal B at the output, the system may be cascaded and/or be operated bi-directionally.

Figure 11:
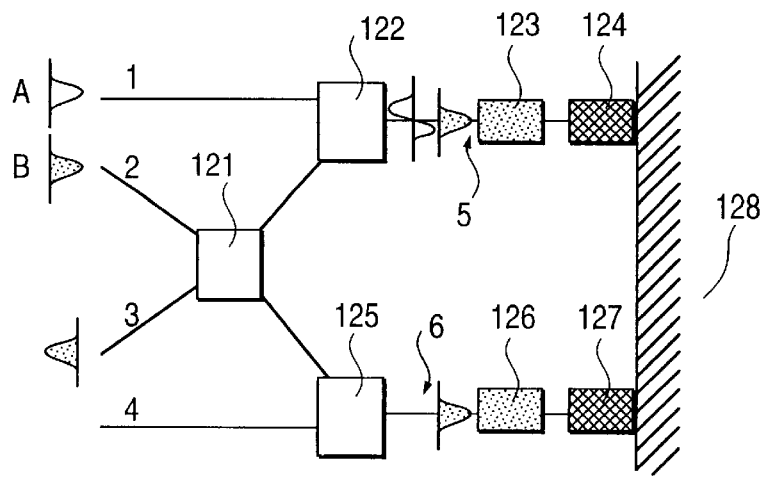
FIG. 11 shows an optical—optical switch with one output or a wavelength converter operating on the principle of cross phase modulation (XPM) and allowing coupling and converting the control signal by means of Converter-Combiner MMIS; the MZI design reflecting this feature also is called a MI configuration.

FIG. 11 is a sketch of an optical—optical switch or wavelength converter with one possible output and operating in cross-phase modulation (XPM) and allowing coupling and converting the control signal by means of MMIs. This system consists of:

a mode coupler 121 splitting an optical input signal B into the two different arms of the MZI configuration.

The number of inputs at the coupler is arbitrary; it is essential however that the input signal be imaged at a given ratio into the two waveguide arms.

a specular layer 128.

at least one component 122 and/or 125 allowing coupling an optical control signal.

at least one or two regions containing a non-linear material 124 and/or 127. Depending on the presence or absence of the optical control signal A, a phase shift is produced in this region in the signal B. The non-linear material may be mounted anywhere on the interferometer arm.

an active or passive phase shifter 123 and/or 126 which can be mounted anywhere on the MZI arms.

The control-signal coupling takes place directly into one of the MZI arms 5 or 6. The optical contrfol signal is coupled by means of an MMI Converter Combiner 122 and/or 125. In the process, the fundamental mode of the optical control signal A is converted into a first-order mode and simultaneously it is combined with the optical input signal. The MMI Converter Combiner is one shown in FIGS. 2, 4, 5, 6, 7, 8 or 9. Both the input signal and the control signal are reflected by the specular layer 128. Depending on the MMI 122 and/or 125 being selected, the control signal will be decoupled fully or in part. The reflected input signal from the waveguide arms 5 and 6 is guided to the mode splitter/combiner and combined. Depending on the phase relation in the waveguide arms 5 and 6, the input signal will be guided to an output different from the waveguide input.

This reflecting MZI configuration also is called an MI configuration.

The system shown in FIG. 11 can be operated as a switch with one output. Inputs 1 and 4 are applicable as possible inputs for the optical control signal. The optical input signal may be applied through the inputs 2 or 3.

The system may be operated as a wavelength converter in that an optical signal B having the wavelength $\lambda_2$ on one of the outputs corresponds to the optical control signal of wavelength $\lambda_1$.

The objective of achieving an optical—optical switch having two good outputs, that is having good ON/OFF switching ratios, can be solved using the switch or wavelength converter discussed above with reference to FIG. 10 and by selecting mode couplers 111 and 112 allowing splitting the input signal at various splitting ratios into the two MZI arms, resp. combining them. A particular switch state at one input is associated to a phase shift $\Delta\phi_1$ and to an intensity ratio p1 of the input signals in the two MZI arms. If the phase shift is changed to $\Delta\phi_2$ and the intensity ratio to p2, the input signal will be guided to the second output.

In an XPM switch, the control signal, for instance in the MZI arm 5, will change the input-signal phase in the region of the non-linear medium. A phase change in a non-linear medium most of the time will also cause a change in the intensity of the same signal. The Kramers-Kronig (KK)

relation describes this phenomenon. In other words, the control signal changes two characteristic values of the input signal in the MZI arm 5, namely phase and intensity. To achieve a good switch with two good outputs, it is necessary therefore that these two characteristic values of the input signal shall be controllable. The switch with mode splitters and combiners deviating from the 50/50 splitting ratio allows controlling said two values:

1. Due to the selection of the control-signal intensity, a phase shift from $\Delta\phi_1$ to $\Delta\phi_2$ is induced as a function of the control-signal intensity, 2. The phase shift $\Delta\phi_1$ induced in the input signal into the MZI arm 5 is accompanied by a change in intensity $\Delta I$ in the input signal in the same MZI waveguide arm as defined by Kramers-Kronig (KK); thereupon, by selecting the splitting ratio in the mode splitter and combiner, it is possible to ensure that said change in intensity corresponds exactly to that needed to pass from an intensity ratio p1 of the two signals in the MZI arms to the ratio p2 needed for the second switch state.

The problem of designing an optical—optical switch with one best possible output can be solved using the switch or wavelength converter shown in FIG. 11 and by selecting a mode coupler 121 deviating from the 50/50 splitting ratio. As in the case of the switch with two possible outputs, this mode coupler 121 allows controlling the two values appearing in an XPM switch.

Herein the expression "asymmetric mode splitters" denotes components able to image the input signal at different splitting ratios onto the two MZI arms, and the expression "asymmetric modes combiners" denotes components able to combine two signals of different intensities into a single output signal. However, the geometry of these components may well be symmetrical. Asymmetric mode couplers therefore may be both asymmetric mode splitters and asymmetric mode combiners.

The switch or wavelength converter shown in FIG. 10, as well as the selection of asymmetric mode couplers 111 and 112 allow solving the problem of making an optical—optical switch with two outputs and evincing good ON/OFF switching ratios. Thanks to the freedom in selecting splitters and combiners with different splitting ratios, the switch may be designed in such manner that the phase shifter is superfluous in achieving the switch state because the second asymmetric combiner 112 can be matched to the phase conditions.

Appropriate mode couplers 111 and 112 are butterfly MMIs [P. A. Besse et al, ECOC 1994, Sep. 25–29, p 669–67, Firenze]. As splitters and combiners they offer various splitting ratios. It is possible to select two different butterfly MMIs as the splitter/combiner 111 and the combiner/splitter 112 in such manner that the switch can be designed to make the phase shifter superfluous to achieve the switch state because the second asymmetric combiner/splitter 112 can be matched to the phase conditions.

Figure 12:
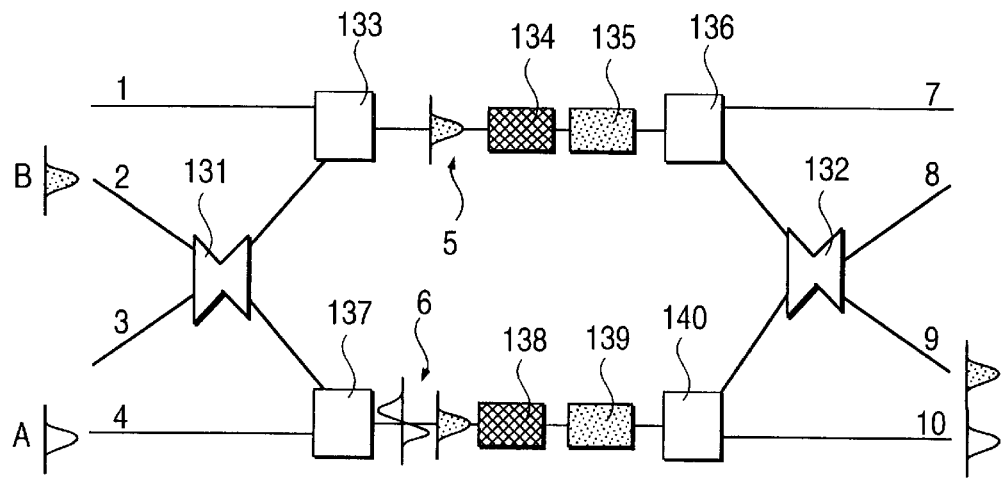
FIG. 12 shows an XPM optical—optical switch with two possible outputs using identical butterfly MMIs as asymmetric mode couplers 131 and 132 to couple and decouple the input signal B; MMI Converter Combiners 133 and 137 are used for coupling the control signal.

FIG. 12 shows an XPM optical—optical switch with two possible outputs and using identical butterfly MMIs for coupling and decoupling the input signal B and MMI Converter Combiners as asymmetric couplers to couple the control signal.

Butterfly MMIs illustratively comprising two inputs and outputs may be used as mode couplers.

Selecting the intensity of the control signal and the asymmetry of the mode couplers makes it possible to optimize both switch states. Illustratively the switching from one input signal B at the input 2 into the outputs 8 and 9 resp. of FIG. 12 will be elucidated. The following notation is used: let $\Delta\phi_1'$ be the phase shift in the MZI arm 6 relative to the arm 5 directly behind the MMI 131 and let $\Delta\phi''$ be the phase shift directly before the MMI 132 in case the input signal is fed to the input 2. Correspondingly, phase shifts $\Delta\phi_2'$ and $\Delta\phi_2''$ are used for an input signal at the input 3, the phase shift of the MZI arm 6 relating to that of the MZI arm 5. In principle the phase differences are always calculated from the arm 6 relative to the arm 5. $\Delta\phi_1$ is the required offset phase shift. $\Delta\phi_2$ is the phase shift generated by the control signal.

Input Signal at Input 2 to Output 8

The butterfly MMI 131 splits the input signal B of intensity $I_0$ at the ratio $p1=I_1/I_2$ into the two MZI arms 5 and 6. Let $I_1$ be the intensity of the input signal at the MZI arm 5 and $I_2$ be that of the arm 6, with $I_0=I_1+I_2$. Immediately behind the MMI 131, the two signals on the two MZI arms differ in phase by $\Delta\phi_1'$. In order that these two signals in the MZI arms 5 and 6 can be combined again at the butterfly MMI Combiner 132, which has the same design as the butterfly MMI 131, into a single signal at the output 8, the signals are required to have, just as before, the intensity ratio p1 as well as the phase relationship $\Delta\phi_1=-\Delta\phi_1'$. Accordingly, as regards this switching process, only the phase relation between the two MZI arms needs to be adjusted. For instance, using a passive phase shifter on the appropriate MZI arm, one might induce a phase shift of $\Delta\phi_1=-2\Delta\phi_1'$. This phase shift need only be matched to the structure once and then may be left as such for all switch states.

Input Signal at the Input 2 to Output 9

Immediately beyond the butterfly MMI 131, the signals in both MZI arms again have an intensity ratio p1 and the mutual phase shaft $\Delta\phi_1'$. In order that the input signal in both MZI arms at the butterfly MMI 132 be combined into a single signal at the output 9, the intensity ratio p2=1/p1 and the phase relation $\Delta\phi_2''=-\Delta\phi_2'$ must be met. Using the control signal that we couple for instance into the MZI arm 6, the relevant additionally required phase shift $\Delta\phi_2$ will be generated in the MZI arm 6. Assuming that the above applied phase shift $\Delta\phi_1$ is still applied to the same MZI arm, a phase shift $\Delta\phi_2=\Delta\phi_1'-\Delta\phi_2'$ will be required. However the control signal generates also a change in intensity $\Delta I$ in the input signal in the MZI arm 6. If the selection of the asymmetry in the butterfly MMI was such that $p2=1/p1=I_1/(I_2-\Delta I)$, then the signal will be switched to the output 9.

Figure 13:
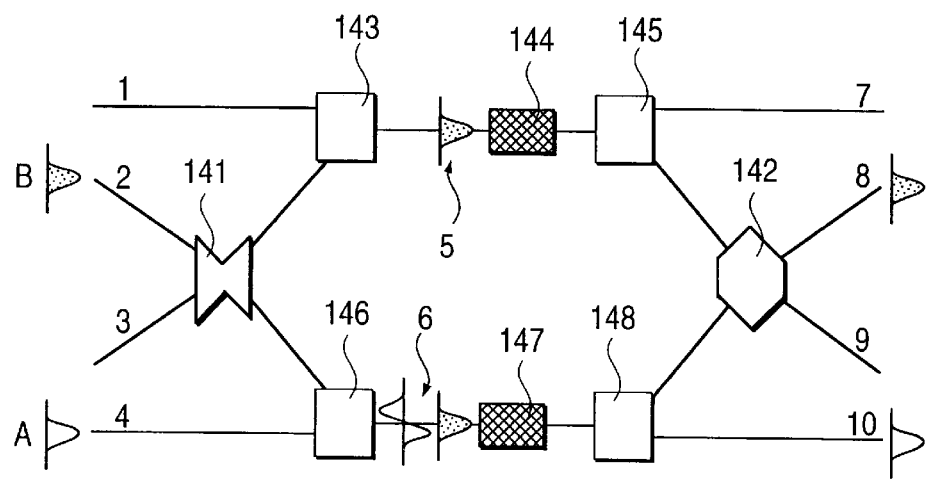
FIG. 13 shows an XPM optical—optical switch with two possible outputs and using different butterfly MMIs in the form of asymmetric mode couplers 141 and 142 to couple the input signal B and further using MMI Converter Combiners 143 and 146 to couple the control signal.

FIG. 13 shows an XPM optical—optical switch with two possible outputs and using different butterfly MMIs for an asymmetric mode splitter/combiner 141 and combiner/splitter 142 to couple and decouple the input signal B and MMI Converter Combiners 143 and 146 to couple the control signal. Thanks to the freedom of selection in splitting and combining at various splitting ratios, the switch can be designed in such a way that the phase shifter 135 and 139, still required in FIG. 12, becomes superfluous to implement the switch states because the second asymmetric combiner/ splitter 142 can be matched to the phase relations. To eliminate an eventual phase offset entailed by technology, it may nevertheless be advantageous to provide a phase shifter. Depending on application, the control signal may be decoupled again, filtered out or left in the MZI arm 5 and/or 6 within an additional component 145 and/or 148. Advantageously decoupling takes place using the MMI Converters-Combiners shown in FIGS. 2, 4, 5, 6, 7, 8 or 9.

An illustrative switching process of an input signal B at the input 2 onto the outputs 9 resp. 8 of FIG. 13 is elucidated next:

Input Signal at Input 2 to Output 9

The butterfly MMI 141 splits the input signal B of intensity I into the ratio $p1=I_1/I_2$ into the two MZI arms 5 and 6. The same notation is used as in the description for FIG. 12. Immediately behind the MMI the two signals in the two MZI arms evince a mutual phase shift $\Delta\phi_1'$.

The butterfly MMI 142 which follows in order to recombine the two signals in the MZI arms 5 and 6 into one output signal is selected in such manner that for an intensity ratio p1 of the intensities in the MZI arms and a relative phase shift $\Delta\phi_1''=-\Delta\phi_1'$ between the phases of the two signals, the signal shall be imaged just on the output 9. Contrary to the case of the switch of FIG. 12, the butterfly MMI 141 generates just the right intensity ratio and the correct phase relation at the MZI input as required in the butterfly MMI 142 at the MZI output. An additional phase shifter is not needed, $\Delta\phi_1=0$.

Possible butterfly MMIs complementing themselves as above already exist. Essentially MMIs are composed of a widened waveguide within which interference effects may take place. For instance a butterfly MMI with a central constriction might be used for the butterfly MMI 141. The corresponding butterfly MMI 142 in that case would be a butterfly MMI with a reciprocal splitting ratio 1/p1. This butterfly MMI then would have to be wider at the center.

Input Signal at Input 2 to Output 8

The switching process is analogous to that described in relation to FIG. 12. A phase shift $\Delta\phi_2=\Delta\phi_2'-\Delta\phi_1'$ is generated by means of a control signal for instance in the MZI arms 6. The control signal also generates a change in intensity $\Delta I$ in the input signal of the arm 6. If the asymmetry in the butterfly MMI was selected just so that $p2=1/p1=I^1/(I_2-\Delta I)$, then the signal shall be switched to the output 8.

The 3×3 MMI Converter Combiner of FIG. 4 is especially well suited to couple the control signal in an XPM optical—optical switch with two good outputs. This component is exceedingly short and offers a large wavelength bandwidth. The MMI is nearly invisible to the input signal B because it is imaged almost 100% on the output. The control signal is imaged in the form of a first-order mode at a conversion efficiency of almost 66% into the MZI arm.

Figure 14:
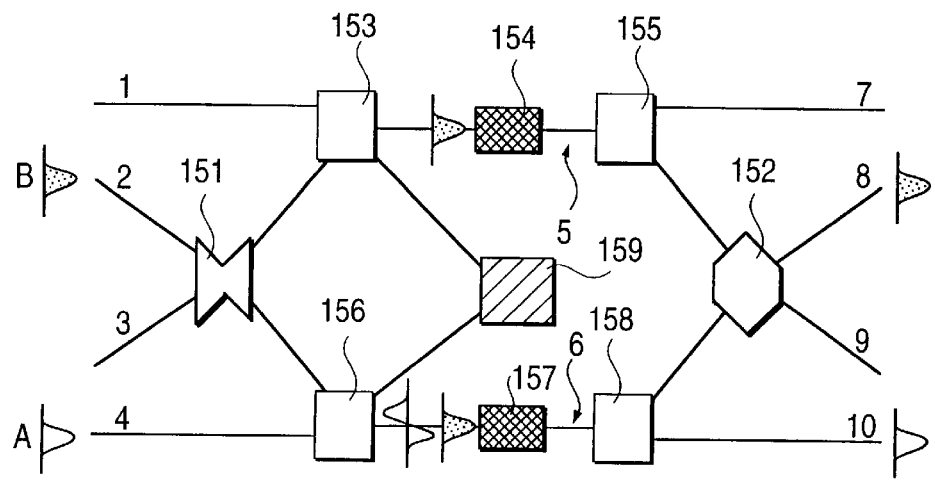
FIG. 14 is an example of coupling and converting the control signal into a first-order mode in an optical—optical switch with two possible outputs using a 3×3 MMI Converter Combiner (FIG. 4a)

FIG. 14 shows an XPM optical—optical switch with two possible outputs and using different butterfly MMIs in the form of asymmetric mode splitters 151 and combiners 152 such as were described in relation to FIG. 13 to couple and decouple the input signal B. 3×3 MMI Converter Combiners 153 and 156 are used to couple the control signal. A switch with identical butterfly MMIs on both sides of the MZI as described in relation to FIG. 12 also is conceivable instead of selecting different butterfly MMIs on both MZI sides.

The residual 33% of the control signal are guided in the component 159 into an absorbing layer. There are an arbitrary number of other ways to guide said 33% of the control signal out of the structure.

Depending on application, the control signal may be decoupled in an additional component 155 and/or 158, be filtered out or be left in the MZI arm 5 and/or 6.

Other ways to couple the control signal into an XPM optical—optical switch with two possible outputs are offered by the (1+1)×1 MMI converter variations #1, #2 or #3.

Figure 15:
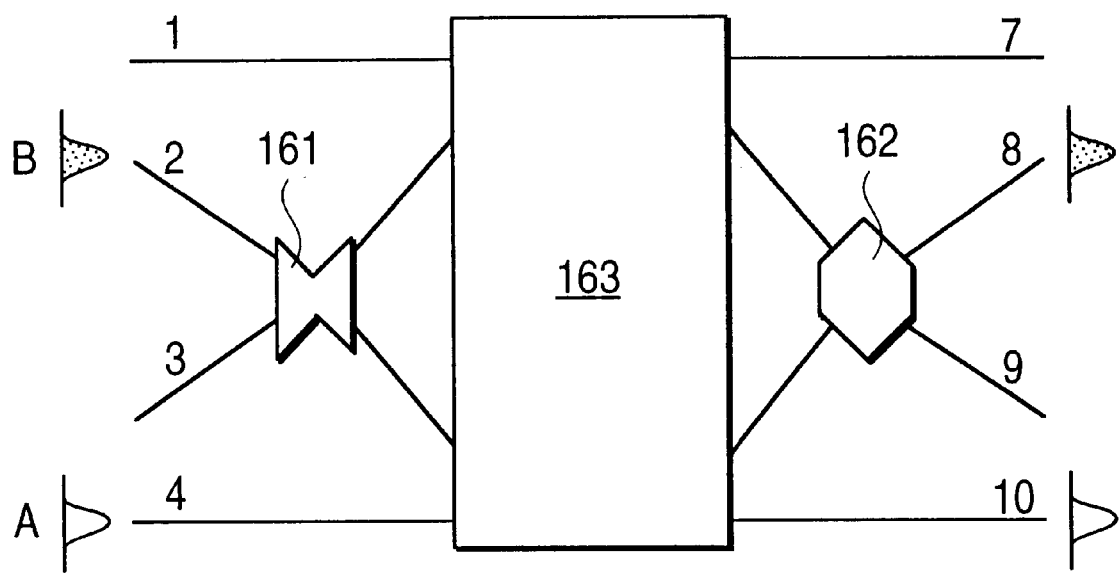
FIG. 15 is a typical XPM optical—optical switch with two outputs offering good switching ratios. The couplers 161 and 162 are butterfly MMIs with approximately reciprocal or identical splitting ratios for the signal intensities. The central portion 163 shows various designs for coupling and decoupling the control signal, further the non-linear region and the phase shifters.

The methods described in relation to FIGS. 12 or 13 may be used to design optical—optical switches with two outputs evincing good ON/OFF switching ratios. The manner in which the signal B is coupled into the MZI configuration or decoupled from it is important to achieve said good ON/OFF switching ratios. The design of the MZI arms per se, the center part, may deviate from the variation described above in relation to FIGS. 12 or 13. FIG. 15 shows an optical—optical switch with two outputs and with good ON/OFF switching ratios. The region of couplers 161 and 162 is designed as described above in relation to FIGS. 12 or 13. The center part 163 representing several and different components is used to couple and decouple where called for a control signal and to generate the non-linear effect, and possibly to assume further functions. MMI Converters Combiners, however also other arbitrary couplers, should be used to couple the control signal. Such might be for instance 2×2 MMI, 3 dB directional couplers, asymmetric Y combiners etc. The control signal also might be coupled when it is a fundamental mode. However at least one region with nonlinear material is mandatory for 163.

The ON/OFF switching ratios in an XPM switch (FIG. 16) also may be improved by mounting two non-linear regions of different thicknesses or sizes (for instance applying different currents if the non-linear medium consists of semiconducting amplifiers . . . ) located within the region 173 and 174. 173 and 174 denote the MZI arms containing both elements for coupling and, where called for, for decoupling the control signal(s) A, and also the non-linear medium and any phase shifters. Assuming that the control signal is generating a change in intensity $\Delta I$ at the input signal on an MZI arm, for instance arm 5, than the thicknesses of the two non-linear media may be selected in such manner that, in the absence of a control signal, the input signal in arm 5 exceeds that in arm 6 by about $\Delta I/2$. After the control signal has been applied to the arm 5, the input signal on this arm will be smaller by about $\Delta I/2$ than on arm 6. By rendering symmetric non-ideal switch states at the two output waveguides, two relatively good and almost identical switching properties will be achieved at the two outputs. In case identical non-linear materials are used initially, a good switching ratio is obtained in the absence of a control signal and a bad one after applying the control signal. Using non-linear media of different thicknesses or sizes generates an additional phase shift which can be compensated by selecting 50/50 mode couplers 171 and 172. A 1×2 MMI of length L, where $$L=(3L_c)/8 \qquad \text{Eq. 7}$$

is used for the mode coupler 171 and a 2×2 MMI of length $$L=(3L_c)/2 \text{ or } L=(3L_c)/6 \qquad \text{Eq. 8}$$

is used for the mode coupler 172, rigorous data about the MMI geometries being found in the reference (M. Bachmann, P. A. Besse & H. Melchior, "General self-imaging properties in N×N multimode interference couplers including phase relations", Applied Optics, vol. 33, pp 3905–3911, July 1994). The MZI arms can be made symmetric by selecting these couplers without requiring an additional phase shifter. Instead of the 2×2 MMI, other 50/50 couplers also may be used, provided they offer similar phase relations for the input signals in order to achieve a switch state. Eq. 1

The above text relating to FIG. 10 suggested a method for an optical—optical switch, offering the possibility of cascading and/or bidirectional operation. The description below provides a further method for designing a cascadable, bi-directionally driven optical—optical switch which, contrary to the case for the method of FIG. 10, comprises only single-mode waveguides and only known mode couplers.

Figure 16:
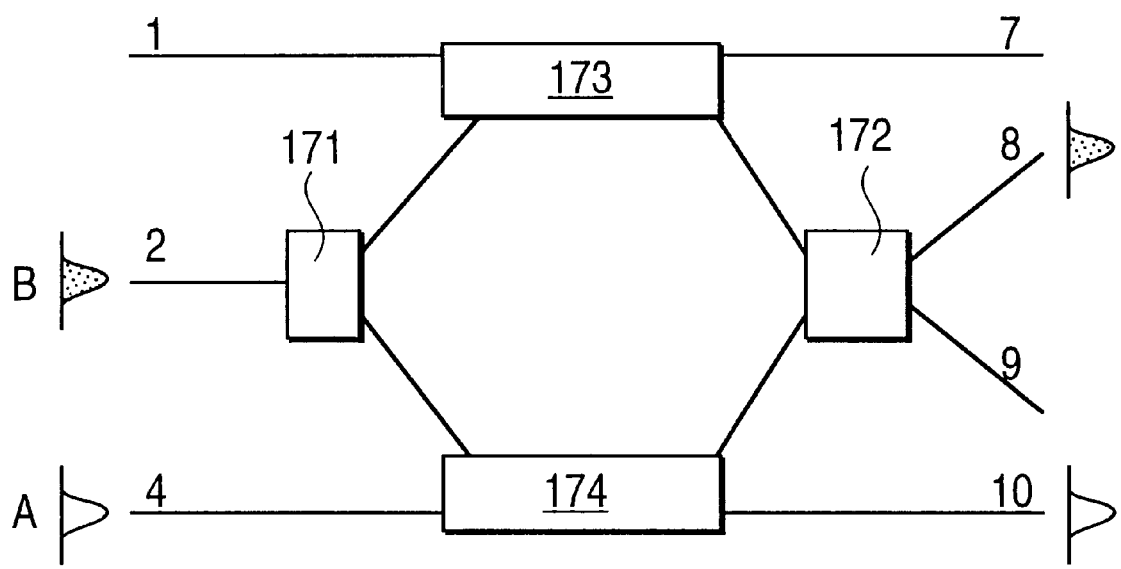
FIG. 16 shows an XPM optical—optical switch with two outputs with improved ON/OFF switching ratios; two differently large non-linear regions in the zones 173 and 174 denote the switch; the mode coupler 171 is a b 1×2MMI and the mode coupler 172 is a 2×2 MMI.
Figure 17:
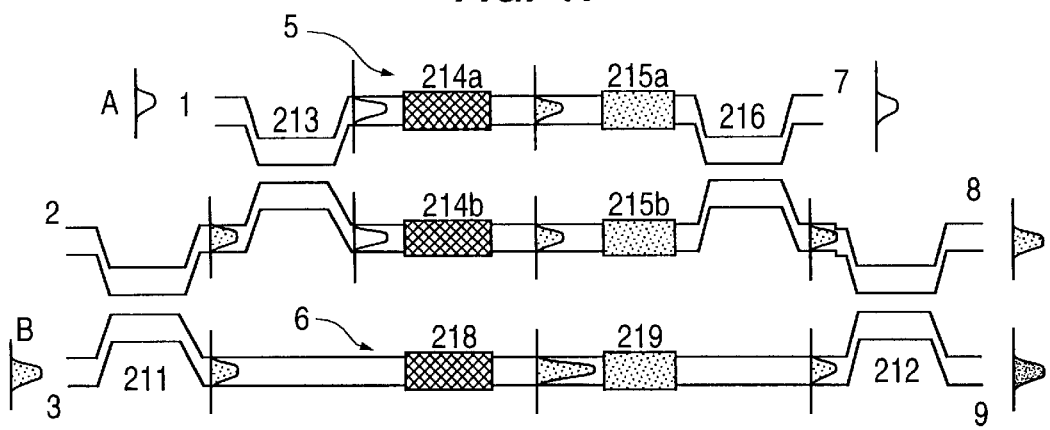
FIG. 17 is an example of an optical—optical switch using only fundamental modes and composed of an "outer" MZI and an "inner" MZI, whereby the signal B and the control signal A also are well separated at the output.

The general procedure is illustrated in FIG. 17. The signal B is coupled for instance into the input 3. The couplers 211 and 212 form a Mach-Zehnder interferometer (MZI), herein denoted as the "outer" MZI. In order to compensate the non-linear changes in intensity and to achieve good ON/OFF switch ratios for the cross and the bar states in the switch/converter, the splitting ratios are matched in couplers 211 and 212. This matching was comprehensively discussed above. The control signal is coupled into one of the MZI arms. To distinguish this signal from the signal B, the arm is designed as the second MZI, called the "inner" MZI. The latter is based on the mode mixer 213 and the demixer 216. 213 and 216 are mode couplers with symmetric splitting ratios. The discrimination between signal B and the control signal is assured by the different relative phases of the modes in both arms of this "inner" MZI. Optical non-linear regions 214a, 214b and 218 are inserted. Illustratively these are optical semiconducting amplifiers. The regions 214a and 214b may also be connected. Passive or active phase shifters 215a, 215b and 219 are mounted anywhere onto the "inner" MZI arms in order to match the interference in the coupler 216 and 212. At least one of the phase shifters 215a or 215b will be used. Illustratively, the phase shifter 215a is selected in such manner that the "inner" MZI always is in the bar state, that is, the input 1 goes to the output 7. Because of symmetry, the "inner MZI always remains in this bar state, regardless of the control signal being coupled or not. In the absence of control signal, the phase shifter 219 is selected in such a way that the test signal arrives at one of the outputs 8 or 9. Moreover another phase shifter may be mounted between the mode coupler 216 and 212. The control signal causes changes in intensity and phase between the "inner" MZI and the arm 6. The change in intensity can be compensated by selecting the splitting ratios of 211 and 212 (description relating to FIG. 15) or by appropriately selecting the mode couplers 211 and 212 with variously thick non-linear regions on the MZI arms of the "outer" MZI (description relating to FIG. 16). The phase change causes switching of the signal B between the outputs 8 and 9. For reasons of symmetry or because it is desired to couple a second control signal, a second "inner" MZI may be mounted on the arm 6. The entire system may function as a purely optical non-linear 1×2 switch with good ON/OFF switching ratios. This system may be operated in cascade because both the signal B and the control signal A can be used anew in other components or are separated at least relatively well from each other. Thereupon the signal A and the signal B can be used again as signal or control signal. Both the signal B and the control signal A can be coupled in the reverse direction and therefore the switch can be operated bi-directionally. All Figures show the mode shapes of signal B and of control signal A. The control signal A is shown in white. The signal B is shown black or dotted (at the output 9). All connecting waveguides contain only fundamental modes.

Figure 18:
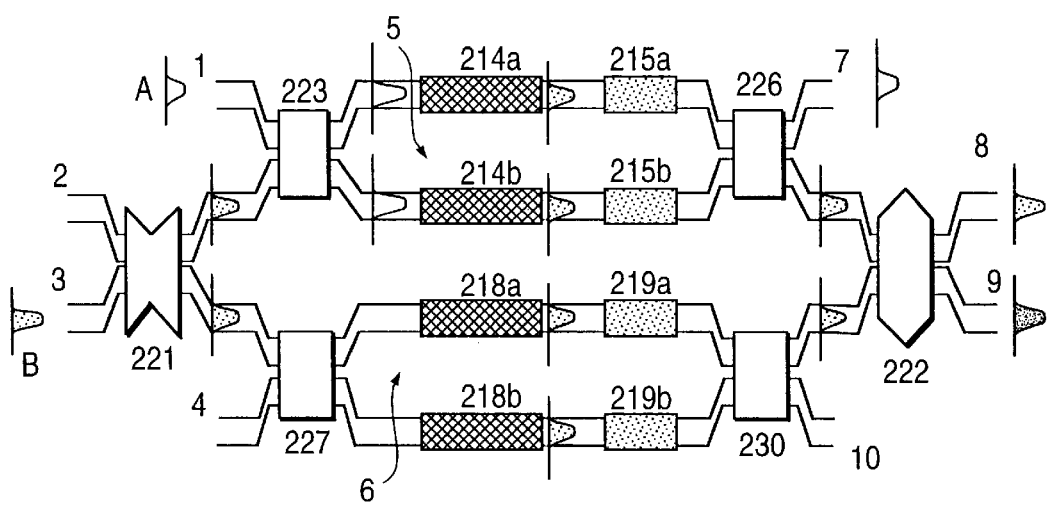
FIG. 18 is an XPM optical—optical switch analogous to that of FIG. 17; butterfly MMIs with approximately reciprocal or identical splitting ratios are used as in the form of mode couplers 171 and 172 and thereby the switch shows good ON/OFF splitting properties.
Figure 19:
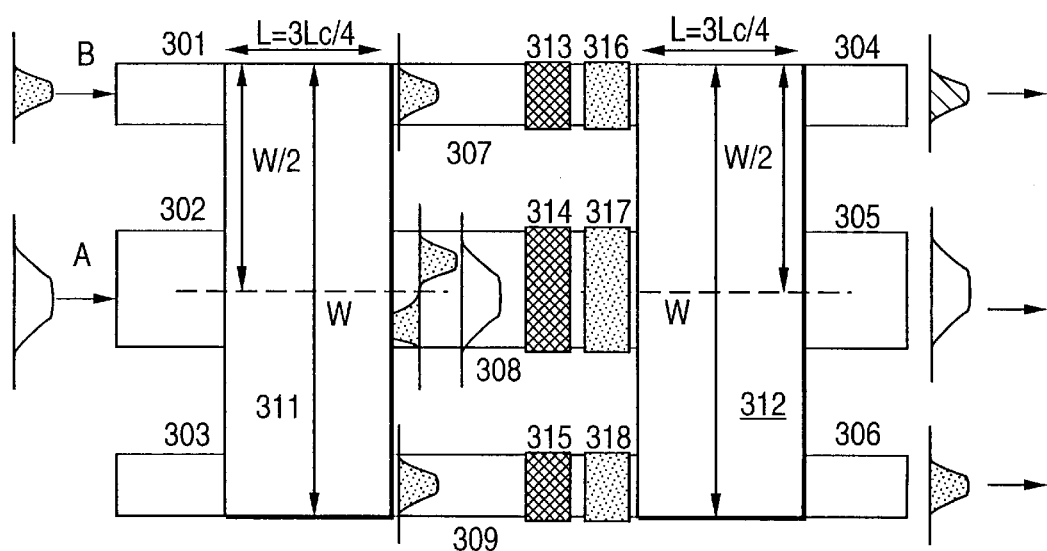
FIG. 19 shows the optical—optical switch in the compact manner of the invention and requiring only one coupler to couple the signal B and the control signal A and also requiring only coupler to decouple said signals, where 311, 312 are 4×4 Converter Combiner MMIs.

FIG. 18 shows a design of the optical—optical switch of FIG. 17. 2×2 MMIs with 50/50 splitting ratios are used as mode couplers 223, 226, 227 and 230 for the "inner" MZIs. Several design solutions are available. Butterfly MMIs are used for the mode couplers 221 and 222. If the changes in intensity are small or non-existent, ordinary MMIs of rectangular geometry and evincing symmetric splitting ratios are used. The selection of the splitting ratios is implemented in the manner of the description relating to FIG. 15. To simplify the design, the "inner" MZIs may be configured (for instance the "inner" MZIs might be located on circles) so that a path difference corresponding to a phase shift of ff results between the MZI arms. In that case the phase shifters would not be needed. It may nevertheless be advantageous to use phase shifters to correct phase shifts caused by technology or design.

The following description relates to a compact XPM optical—optical switch composed of only a few components.

A single component, namely the multimode interference (MMI) mode coupler of FIG. 5a may be used to split the signal B and to couple the control signal A. The same MMI allows combining the signal B and decoupling the control signal. The middle input 302, the middle connecting waveguide 308 and the middle output 305 are located at the center of the two MMIs 311 and 312. These waveguides should be wide enough to guide first-order modes. The outer inputs 301, 302, the outer connecting waveguides 307, 309 and the outer outputs 304, 306 are located flush or nearly flush with the MMI edge. The signal B is introduced into an input fully at the edge of the input MMI. The signal B is split into two fundamental modes guided in the waveguides 307 and 309 and into a first-order mode guided in the waveguide 308. The phases must be modified at the input of the second MMI. Illustratively, the following condition may be met by using different lengths of the connection waveguide: compared to the inner connection waveguides, the outer connection waveguides evince a phase difference of $\pm\pi/2$ at the input of the second MMI. In the absence of a control signal the light then will exit at one of the outer outputs. In case the control signal A is applied, a difference in index of refraction generated in the non-linear region 312 ensues at the middle connection waveguide 308. As a result the signal B switches from one outer output waveguide to the other. The system is bidirectional both for the control signal A and for the signal B. The system allows cascading because the signals A and B are separated.

The problem of long carrier recombination-time reducing the switching rate can be solved for instance by introducing a second, time-shifted optical control signal into the second MZI or MI arm. Alternatively the two non-linear regions may be shifted spatially relative to each other while the control signals are transmitted simultaneously in both MZI arms. All switches of the invention discussed above may be operated in such manner. The description below concerns illustrative switches that solve this problem in another manner: namely, in that the optical signals are guided in mutually time-shifted manner along the same non-linear region. The switches may be designed to be polarization-independent. They are especially appropriate as multiplexers, demultiplexers, however they may also be used to generate narrow pulses.

Figure 20:
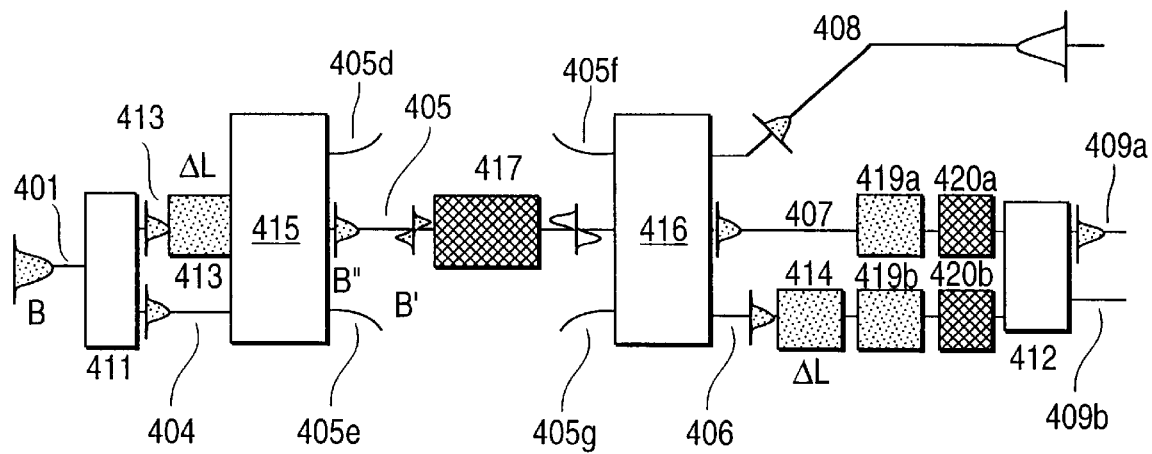
FIG. 20 is an example of an XPM optical—optical switch splitting in two an optical signal B into the portions B' and B" on account of the mode order and guiding them in time-shifted manner in the non-linear region 417, whereby the control signal may be transmitted in time in such manner that only the second signal B" shall undergo a change in refractive index.

FIG. 20 shows an XPM optical—optical switch splitting in two a signal B by ordering the differing portions B' and B" of the mode and guiding them in time-shifted manner to the nonlinear region 417. The system is composed of two mode couplers 411 and 412 forming the MZI. Illustratively this may be an MZI configuration as described in the above text in relation to FIG. 15 (with two inputs) or FIG. 16 (with a single input 401). Moreover there are two regions wherein the waveguides 403, 404 as well as 406, 407 must be mounted in such manner that the two signals B' and B" are separated in time and then are being recombined. This may be implemented for instance using a longer waveguide arm 413 and 414. To convert and reconvert one of the signals into a first-order mode, a Converter Combiner MMI (415 and 416) is used in the manner proposed in the above description in relation to FIGS. 4a, 5b, 6, 7 and 8. Advantageously at least one of the couplers 415 or 416 is a 4×4 Converter Combiner MMI as shown in FIG. 5a whereby the control signal can be coupled as a first-order mode. Depending on the selection of the Converter Combiner MMI 415 and 416, waveguides 405d–g must still be added to bypass lossy modes. Also the control signal might be coupled as a fundamental mode, using a properly selected coupler, into the waveguide arm 405. The intensities and phases are advantageously corrected by further inserting phase shifters 419a and 419b as well as signal amplifiers anywhere between the coupler 416 and 412. It must be borne in mind that the fundamental mode and the first-order mode need not mandatorily be equally amplified and do not mandatorily experience the same index of refraction in the waveguide.

SWITCH OPERATION: In the absence of a coupled control signal 417 after the first signal B' has transited, the subsequent signal B" will be free of any additional phase shift. If on the other hand a control signal is present before or during the time B" is in 417, then B" will undergo a phase shift. As a result the signal B switches from one output waveguide to the other. Depending on the configuration of the components, the switch may be operated bi-directionally. Further components may be inserted in the region of the waveguide 405.

Figure 21:
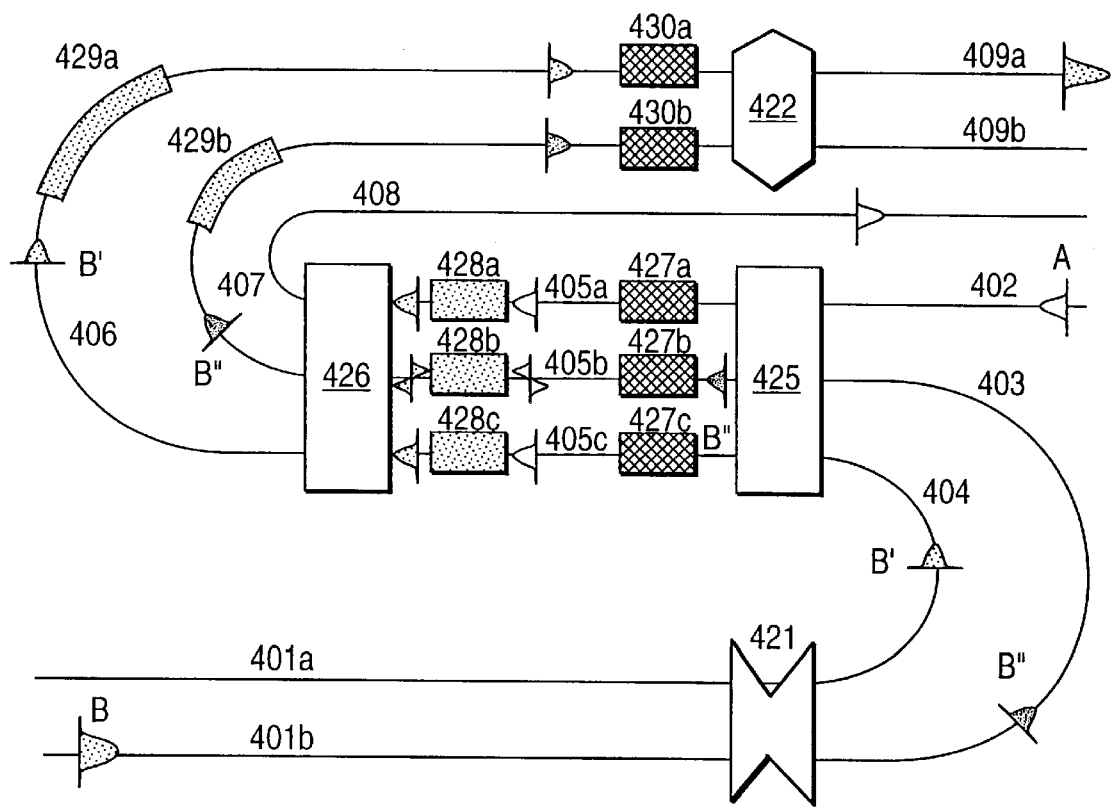
FIG. 21 is an example of an XPM optical—optical switch analogous to that of FIG. 20 having a 4×4 Converter Combiner MMI as shown in FIG. 5*a;*

FIG. 21 shows another implementation of the method of FIG. 20. The separation in time and recombination of the signals is implemented by curves of different radii and where called for by a translation of 403 or 429a relative to 404 or 429b resp. The couplers 425 and 426 are 4×4 Converter Combiner MMIs (FIG. 5a). This selection allows imaging almost 100% the signal of the waveguide 404 almost by 100% onto the waveguide 406 and to image the control signal of the waveguide 402 almost by 100% onto 408. The active or passive phase shifters 428a–c may be used in this process to properly adjust the phases on the three waveguides. 429a and b are additionally useful phase shifters, but they are not mandatory. The signal amplifiers 430a and b are useful but not mandatory. The control signal A entails a change in phase and of carriers in all three non-linear regions. However only that change in the non-linear region 427b is significant for the signal B". Depending on how strong this phase change was, the signal will be switched from the output 409a to the output 409b and vice-versa. The non-linear regions 427a–c need not have the same geometry.

Figure 22:
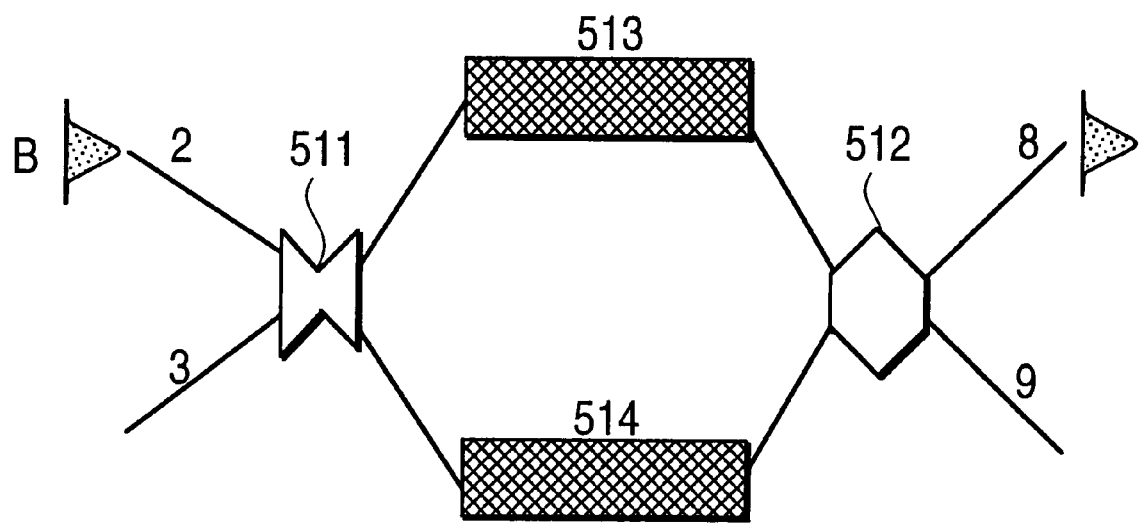
FIG. 22 is a schematic of an electrically controlled optical switch with good ON/OFF switching ratios based on the MZI configuration of FIG. 15.
Figure 23:
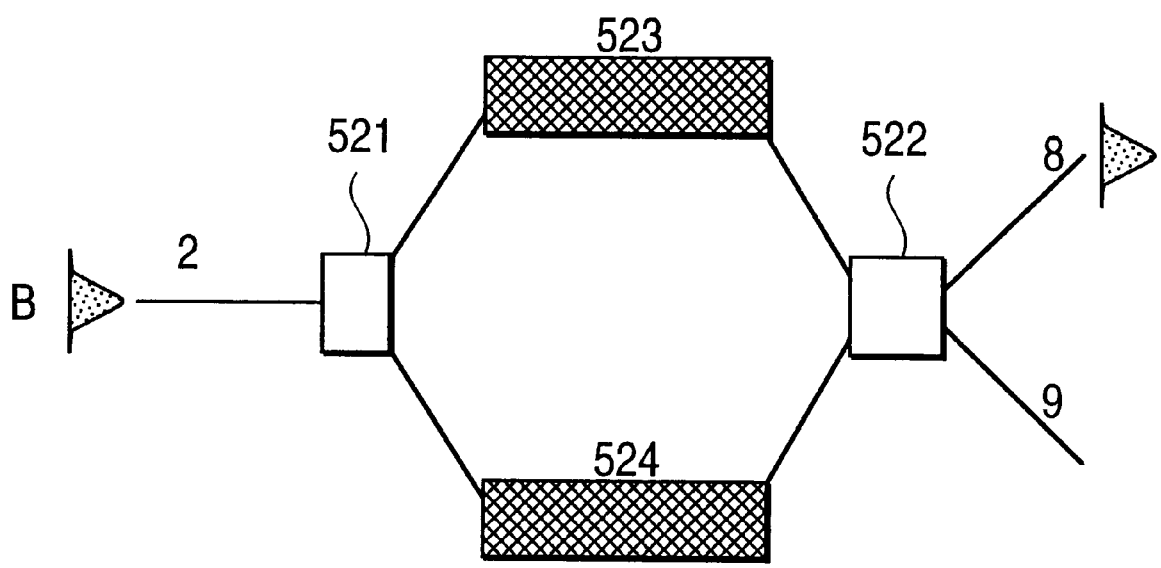
FIG. 23 is a schematic of an electrically controlled optical switch with good ON/OFF switching ratios based on the MZI configuration of FIG. 16.

The optically controlled switches of the above description relating to FIGS. 15 and 16 and having good ON/OFF switching ratios also may be operated as electrically controlled switches. As a result and as shown in FIGS. 22, 23, the inputs and outputs as well as the couplers for the optical control signal are eliminated. The MZI is designed on the other hand in the manner of the procedure of FIG. 15 and/or FIG. 16. The non-linear regions are semiconducting amplifiers 513, 514, 523 and 524. The changes in index of refraction and intensity now are produced by applying a modulated current to one of the non-linear regions such as 513 or 523. The other non-linear region is powered with DC.

We claim:

1. A cross-phase-modulated optical—optical switch comprising a mode splitter (111) having one or several waveguide inputs for an optical input signal (B) and for splitting said input signal into two arms (5, 6) of a Mach-Zender interferometer;

a nonlinear optical material (114, 118) in at least one of said arms;

a phase shifter (115, 119) in at least one of said arms;

a first mode combiner (112) coupled to said arms for imaging the input signal (B) onto said arms of waveguides; and a second mode combiner (113, 117) for coupling a control signal onto one of said arms, said second combiner comprising an multimode interferometer converter combiner.

2. A switch according to claim 1 wherein said mode splitter and mode combiner (111, 112) allow imaging with a selected one of a plurality of splitting ratios and recombining of signals at the outputs, thereby forming a switch/wavelength converter having good ON/OFF switching characteristics.

3. A switch according to claim 2 wherein said mode couplers (111, 112) have different splitting characteristics from each other to permit elimination of offset in said phase shifters (115, 119).

4. A switch according to claim 3 wherein said mode couplers are mode splitters/combiners, operating as splitters in one direction and combiners in the opposite direction, and wherein said splitters/combiners and said combiners/splitters have substantially reciprocal splitting and combining ratios.

5. A switch according to claim 2 wherein said mode splitter and mode combiner are mode splitters/combiners, operating as splitters in one direction and combiners in the opposite direction, and wherein said mode splitters/combiners and said mode combiners/splitters are butterfly multimode interferometers.

6. A switch according to claim 2 wherein said mode couplers (131, 132) are constructed as identical butterfly multimode interferometers.

7. A switch according to claim 1 including filter means for filtering out said control signal.

8. A cross-phase-modulated optical—optical switch comprising a mode splitter (121) having a waveguide input for an optical input signal (B) and for splitting said input signal into two arms (5, 6) of a Michelson interferometer;

a nonlinear optical material (124, 127) in at least one of said arms;

a specular reflective surface for reversing signals in said arms;

said mode splitter (121) operating as a first mode combiner for reflected signals from said arms and for imaging the input signal (B) onto two arms and one of two output waveguides; and a second mode combiner (122, 125) for coupling a control signal onto one of said arms, said second combiner comprising a multimode interferometer converter combiner.

9. A switch according to claim 8 wherein said mode splitter (121) is an asymmetric mode splitter to allow imaging with a selected one of a plurality of splitting ratios thereby having good ON/OFF switching ratios.

10. A switch according to claim 9 wherein the multimode interferometer-converter combiner has a length $L=3[4nW^2/N\lambda]$ with N=4 and includes means for splitting a first input mode signal (A) into two equal intensity parts and feeding the two equal parts to two spaced-apart waveguide inputs;

means for shifting the phase of at least one of the two equal parts so that the phase difference between the equal parts is 180°; and means for guiding a second input mode signal (B) to a center waveguide input of the multimode interferometer converter combiner.

11. A switch according to claim 9 wherein said multimode interferometer has three waveguide inputs, wherein the first and second signals are first coupled into two inputs of a second multimode interferometer, said second input mode signal being guided into a center waveguide input of the second multimode interferometer being coupled out substantially unchanged and coupled to the center waveguide input of the first multimode interferometer, and including in the second multimode interferometer, means for splitting the mode signal to be converted into the second multimode interferometer into the two equal parts before shifting phase.

12. A switch according to claim 9 wherein the multimode interference converter combiner has a length $L=4nW^2/N\lambda$ with N=3 and further comprises a waveguide input for an input signal coupled to said first surface of said multimode interferometer at a distance 2W/3 from the first longitudinal edge; and a waveguide input for a control signal coupled at the longitudinal edge of said first surface of said multimode interferometer, whereby optical control signal fundamental modes (A) are imaged onto a first and zero order mode and of which the first order mode is made to overlap with the fundamental mode input signal (B) whose image is imaged onto a fundamental mode.

13. A switch according to claim 8 including a phase shifter (123, 126) in at least one of said arms.

14. A cross-phase modulation (XPM) optical—optical switch comprising a first, outer Mach-Zehnder interferometer for receiving an optical input signal and having an input coupler (211) and an output coupler (212), said input and output couplers having matched splitting ratios and being coupled by optical arms;

a second, inner Mach-Zehnder interferometer having a mode mixer (213) and a mode demixer (216), said mode mixer and said mode demixer having symmetric splitting ratios and being coupled by optical arms;

optical non-linear regions in said optical arms between said mode mixer and said mode demixer and between said input and output couplers; and waveguides for coupling an input optical signal to said input coupler and an optical control signal to said mixer, discrimination between said input signal and said control signal at the demixer being accomplished by phase differences within said second, inner Mach-Zehnder interferometer.

15. A switch according to claim 14 including phase shifters in said optical arms.

16. A switch according to claim 15 wherein said outer Mach-Zehnder interferometer comprises 1×2 and 2×2 multimode interferometers and said inner Mach-Zehnder interferometer comprises 2×2 multimode interferometers.

17. A switch according to claim 14 wherein said outer Mach-Zehnder interferometer comprises 1×2 and 2×2 multimode interferometers and said inner Mach-Zehnder interferometer comprises 2×2 multimode interferometers.

18. A switch according to claim 14 wherein said outer Mach-Zehnder interferometer comprises butterfly multimode interferometers and said inner Mach-Zehnder interferometer comprises 2×2 multimode interferometers.

19. A switch according to claim 14 wherein said outer Mach-Zehnder interferometer comprises butterfly multimode interferometers and said inner Mach-Zehnder interferometer comprises 2×2 multimode interferometers.

20. A cross-phase modulation (XPM) optical—optical switch according to claim 14, having two inner Mach-Zehnder interferometers.

21. An optical—optical switch comprising a middle section (163) containing at least one non linear medium and having a plurality of input and output waveguides coupled to input and output surfaces thereof;

a mode splitter (161) having one or several waveguide inputs for an optical input signal (B) and for splitting said input signal into two arms that are guided into said middle section; and a mode combiner (162) connected to two waveguides from said middle section for imaging the input signal (B) onto the arms of output waveguides, said mode splitters and combiners comprising butterfly multimode interferometers with identical or substantially reciprocal splitting ratios.

22. An optical—optical switch comprising an interferometer configuration including first and second optical paths each having coupling elements and a non-linear optical medium, said paths having non-linearities different from each other, said coupling elements each having at least two optical inputs and at least two optical outputs;

means for delivering an optical signal to one input of one of said coupling element optical inputs;

an input mode coupler (171) comprising a 1×2 multimode interferometer having a length L=(3L$_c$)/8 for receiving an input control signal (B) and for splitting said input control signal and delivering split signals to said coupling elements;

an output mode coupler (172) comprising a 2×2 multimode interferometer having a length L=(3L$_c$)/2 or L=(3L$_c$)/6 for receiving output signals from said coupling elements and for delivering split switched output signals.

23. A cross-phase modulation (XPM) optical—optical switch comprising mode coupler means (411, 415) for receiving an input signal and separating said input signal into two mode signals of different orders separated in time and sequentially coupling said two signals into a non-linear region;

means for converting the two signals into fundamental modes;

means for matching said two signals in time;

a mode coupler (412, 416) for receiving and converting said time-matched signals and combining said signals so that they interfere; and means for coupling a resulting signal to an output.

24. A switch according to claim 23 wherein said mode couplers comprise 4×4 converter combiner multimode interferometers.

25. An optical—optical switch comprising an Mach-Zehnder interferometer configuration with a mode splitter (511) having waveguide inputs for an optical input signal (B) and for splitting said input signal into two arms of a Michelson interferometer;

sections with non-linear materials on each arm of said Michelson interferometer;

a mode combiner (512) for combining the split twp parts of the input signals into an output guide with said splitters (511) and combiners (512) comprising multimode interference couplers having reciprocal splitting ratios.

26. An optical—optical switch comprising an Mach-Zehnder interferometer optical waveguide configuration with a 1×2 mode splitter (521) having one waveguide input for an optical input signal (B) and for splitting said input signal into the two arms of the Michelson interferometer;

two sections with differently operated non-linear material sections in each arm of the Michelson interferometer; and a mode combiner (522) for combining said split-up two input signals into an output guide.

27. A method of converting an optical signal of low-order mode into optical signals in higher order modes comprising the steps of providing a multimode interferometer comprising a material having a known effective refractive index which is higher than an effective refractive index of surrounding material, the multimode interferometer having a first input surface, a second output surface and a length L between the first and second surfaces substantially equal to $$L = \frac{1}{N} \cdot \frac{(4nW^2)}{\lambda}$$

wherein N is a number representative of a number of possible inputs and outputs, n is the effective refractive index of the multimode interferometer material, W is an equivalent width of the multimode interferometer in a direction perpendicular to the length, and λ is the wavelength of an optical signal, coupling a waveguide input to a selected location on the first surface of the multimode interferometer and at least one waveguide output to the second surface of the multimode interferometer, coupling an optical signal of a first, low-order mode into the waveguide input, and receiving an optical signal of order higher than the low-order mode into at least one waveguide output.

28. A method according to claim 27 and further including superposing a second input optical mode signal on the output mode signal into at least one output waveguide, a device formed by this method being a multimode interference converter-combiner.

29. A method according to claim 28 wherein the multimode interferometer has first and second longitudinal edges between said first and second surfaces and wherein the selected location of the waveguide input is chosen adjacent the first longitudinal edge so that symmetric modes of order m are imaged on one or more modes of order 2m+1 and order m.

30. A method according to claim 29 wherein n=3K where K is another number and further comprising coupling a second waveguide input to the first surface of the multimode interferometer at a distance 2W/3 from the first longitudinal edge.

31. A method according to claim 30 and further comprising coupling a third waveguide input to the first surface at a distance of W/3 from the first longitudinal edge, whereby first optical fundamental modes (A) imaged onto (3K−1)/2 or (3K−2)/2 first order modes, depending on whether K is odd or even, of which K images are made to overlap K images of a second fundamental mode (B) which images are imaged onto fundamental modes.

32. A method according to claim 29 where N=4K and comprising providing a second waveguide input at a distance of W/2 from the first longitudinal edge imaging optical fundamental modes (A) onto 2K−1 first order modes of which K of the images overlap K images of a second fundamental mode (B), which images are imaged on fundamental modes.

33. A method according to claim 28 wherein the number of output waveguides coupled to the multimode interferometer is K and wherein N=4K, and including splitting a first input mode signal (A) into two equal intensity parts, shifting the phase of at least one of the two equal parts so that the phase difference between the equal parts is 180° when K is odd and 0° when K is even, feeding the two equal parts to two spaced-apart waveguide inputs adjacent longitudinal edges of the first surface of the multimode interferometer, and guiding a second input mode signal (B) to a center waveguide input of the multimode interferometer.

34. A method according to claim 33 wherein the multimode interferometer has three waveguide inputs, wherein the first and second signals are first coupled into two inputs of a second multimode interferometer, the second input mode signal guided into a center waveguide input of the second multimode interferometer being coupled out substantially unchanged and coupled to the center waveguide input of the first multimode interferometer, and including in the second multimode interferometer, splitting the mode signal to be converted into the second multimode interferometer into the two equal parts before shifting phase.

35. A method according to claim 34 including shifting the two multimode interferometers together until they touch each other and the waveguides between them disappear, and providing the necessary phase shifts of 180° and 0° by tilting the two multimode interferometers next to each other.

36. A method according to claim 28 and including imaging one optical fundamental mode (A) as a first order mode onto K waveguide outputs and concurrently splitting a second optical fundamental mode (B) into K fundamental modes overlapping the first order modes, the efficiency of conversion of the one fundamental mode (A) and of splitting of the second optical fundamental mode (B) being substantially 100%.

37. An optical—optical switch comprising a first multimode interferometer converter combiner (311) having a length $L=3L_c/4$ for converting a fundamental mode input signal (B) into first and zero order modes and for mapping a second zero order mode signal unchanged onto a zero order mode, wherein $L_c$ equals $(4nW^2)/3\lambda$, W is the width of the multimode interferometer, n is the effective index of refraction and $\lambda$ is the wavelength in vacuum, an identical second multimode interferometer converter/combiner (312) for back-conversion of the first order mode into a fundamental mode and for coupling out the input signal and a control signal, input waveguides guided to the central input of said first converter combiner for said control signal, input waveguides guiding said signal to longitudinal edges of said first converter/combiner, three waveguides connecting the two converter/combiners with optical waveguides at upper and lower longitudinal edges of the converter/combiners and at the center, output waveguides for said input signal at the upper and lower longitudinal edges of said second converter/combiner, and an output waveguide for said control signal at the center position of said second converter/combiner.

* * * * *